United States Patent
Li et al.

(10) Patent No.: US 7,542,073 B2
(45) Date of Patent: Jun. 2, 2009

(54) SCENE CAPTURING AND VIEW RENDERING BASED ON A LONGITUDINALLY ALIGNED CAMERA ARRAY

(75) Inventors: Jiang Li, Beijing (CN); Heung-Yeung Shum, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 690 days.

(21) Appl. No.: 10/970,233

(22) Filed: Oct. 21, 2004

(65) Prior Publication Data

US 2005/0083409 A1 Apr. 21, 2005

Related U.S. Application Data

(62) Division of application No. 09/606,857, filed on Jun. 28, 2000, now Pat. No. 7,092,014.

(51) Int. Cl.
*H04N 5/225* (2006.01)
*H04N 7/00* (2006.01)
*H04N 5/232* (2006.01)

(52) U.S. Cl. .............. 348/218.1; 348/39; 348/211.11; 348/373

(58) Field of Classification Search .............. None
See application file for complete search history.

(56) References Cited

U.S. PATENT DOCUMENTS

| 5,990,898 | A | 11/1999 | Urano |
| 6,552,744 | B2 * | 4/2003 | Chen ........................ 348/218.1 |
| 6,750,860 | B1 * | 6/2004 | Shum et al. ................... 345/419 |
| 7,015,954 | B1 * | 3/2006 | Foote et al. ............... 348/218.1 |

OTHER PUBLICATIONS

Adelson et al., "The Plenoptic Function and the Elements of Early Vision" Computational Models of Visual Processing MIT Press 1991 pp. 3-20.
Chen et al., "View Interpolation for Image Synthesis" SIGGRAGH 93 Aug. 1993 pp. 279-288.

(Continued)

*Primary Examiner*—Thai Tran
*Assistant Examiner*—Heather R Jones
(74) *Attorney, Agent, or Firm*—Lee & Hayes, PLLC

(57) ABSTRACT

In one embodiment, a longitudinal camera array is rotated through a capture cylinder, with each camera in the array capturing multiple images as the array rotates. These images can be looking outward along the radials of the cylinder, or alternatively looking tangential to the cylinder. The longitudinal camera array allows the surrounding scene to be captured from multiple different planes that are substantially parallel to the ends of the capture cylinder, allowing for more accurate subsequent rendering of the scene. A view of the scene can be subsequently rendered by determining a location and direction of view of an observer, and then selecting one or more of the multiple lateral and longitudinally adjacent capture images, as well as one or more pixels within that capture image(s), to use to determine a display value for the pixel.

38 Claims, 15 Drawing Sheets

OTHER PUBLICATIONS

Gortler et al., "The Lumigraph" SIGGRAPH 96 Aug. 1996 pp. 43-54.
Levoy et al., "Light Field Rendering" SIGGRAPH 96 Aug. 1996 pp. 31-42.
McMillian et al., "Plenoptic Modeling: An Image-based Rendering System" SIGGRAPH 1995 Aug. 1995 pp. 39-46.
Peleg et al.,"Stereo Panorama with a Single Camera" Proc. Conference on Computer Vision and Pattern Recognition Conference 1999.
S.E. Chen, "QuickTime VR- An Image-based Approach to Virtual Environment Navigation" SIGGRAPH 95 Aug. 1995 pp. 29-38.
Shade et al., "Layered Depth Images" SIGGRAPH 98 Jul. 1998 pp. 231-242.
Shum et al., "Rendering with Concentric Mosaics" SIGGRAPH Aug. 1999 pp. 299-306.
Szeliski et al., "Creating Full View Panoramic Image Mosaics and Environment Maps" SIGGRAPH 97 1997 pp. 251-258.

* cited by examiner

SCENE CAPTURING AND VIEW RENDERING BASED ON A LONGITUDINALLY ALIGNED CAMERA ARRAY

RELATED APPLICATIONS

This application is a divisional application of U.S. patent application Ser. No. 09/606,857, filed Jun. 28, 2000, entitled "Scene Capturing and View Rendering Based On A Longitudinally Aligned Camera Array" to Jiang Li and Heung-Yeung Shum, which is hereby incorporated by reference herein.

TECHNICAL FIELD

The invention relates to capturing scenes and rendering views from the captured scenes, and more particularly to scene capturing and view rendering based on a longitudinally aligned camera array.

BACKGROUND OF THE INVENTION

Image rendering in computer graphics has been a continually evolving field, with more and more techniques being developed as time goes on and computer technology progresses. Prior rendering approaches often involved constructing or recovering a complete geometric and photometric model of a 3D scene. However, these approaches are typically complex and computationally intensive. One image-based rendering approach that foregoes a need for a geometric/photometric model of a scene uses a plenoptic function to describe the scene as previously described by Adelson and Bergen in "The plenoptic function and the elements of early vision", *Computational Models of Visual Processing*, pp. 3-20. MIT Press, Cambridge, Mass., 1991.

The original Adelson and Bergen work defined a 7D plenoptic function as the intensity of light rays passing through the camera center at every location $(V_x, V_y, V_z)$ at every possible angle $(\theta, \phi)$, for every wavelength $\lambda$, at every time t, i.e., $$P_7 = P(V_x, V_y, V_z, \theta, \phi, \lambda, t) \quad (1)$$

In recent years a number of image-based rendering techniques have been proposed to model and then render real or synthetic scenes and objects based on attempts to simplify the plenoptic function. For example, McMillan and Bishop have proposed constructing a complete 5D plenoptic function in "Plenoptic modeling: An image-based rendering system," *Computer Graphics* (SIGGRAPH'95), pp. 39-46, August 1995:

$$P_5 = P(V_x, V_y, V_z, \theta, \phi) \quad (2)$$

In this prior work, two of the variables in the original equation (equation (1)) are dropped, namely time t and light wavelength $\lambda$. This approach assumes a static environment having fixed light conditions.

A 4D parameterization of the plenoptic function has also been proposed by M. Levoy and P. Hanrahan in "Light field rendering," *Computer Graphics Proceedings, Annual Conference Series*, pp. 31-42, Proc. SIGGRAPH'96 (New Orleans), August 1996, and S. J. Gortler, R. Grzeszczuk, R. Szeliski, and M. F. Cohen in "The Lumigraph," *Computer Graphics Proceedings, Annual Conference Series*, pp. 43-54, Proc. SIGGRAPH'96 (New Orleans), August 1996. With both of these systems, by staying outside a convex hull or bounding box of an object, the 5D complete plenoptic function can be simplified to a 4D light field plenoptic function, i.e., $$P_4 = P(u, v, s, t) \quad (3)$$

where (u, v) and (s, t) parameterize two bounding planes of the convex hull.

There have even been 2D simplifications proposed, such as cylindrical panoramas by S. Chen in "QuickTime VR," *Computer Graphics Proceedings, Annual Conference Series*, pp. 29-38, Proc. SIGGRAPH'95, August 1995, and spherical panoramas by R. Szeliski and H. Shum in "Creating full view panoramic image mosaics and texture-mapped models," *Computer Graphics Proceedings, Annual Conference Series*, pp. 251-258, Proc. SIGGRAPH'97, August 1997, where the viewpoint in the scene is fixed and only viewing directions can be changed, i.e., $$P_2 = P(\theta, \phi) \quad (4)$$

The 2D embodiment of the plenoptic function is the easiest to construct. However, the 2D parameterization of the plenoptic function does not allow novel views from different viewpoints within the scene to be rendered. Although it would be possible to render novel views using the 5D or 4D embodiments of the plenoptic function, it is very time and storage consuming to construct a 5D complete plenoptic function. In addition, the prior 4D embodiments are limited to looking at a small object from the surrounding environment (i.e., in an "outside-looking-in" situation), rather than looking around the outside environment (i.e., in an "inside-looking-out" situation).

More recently, a 3D plenoptic function has been proposed by Heung-Yeung Shum and Li-Wei He in "Rendering with concentric mosaics," *Computer Graphics Proceedings, Annual Conference Series*, pp. 299-306, Proc. SIGGRAPH'99, August 1999. Their method allows an observer to move freely within a 2D circular region and observe lateral parallax and lighting changes without geometric or photometric scene model recovery. However, situations can arise where the method has difficulty correctly reproducing rays off the capture plane, resulting in vertical distortions.

The scene capturing and view rendering based on a longitudinally aligned camera array described below addresses these and other disadvantages.

SUMMARY

Capturing real and/or synthetic scenes based on a longitudinally aligned camera array is described herein, as well as the rendering of views of the scenes.

According to one aspect, a longitudinal camera array is rotated through a capture cylinder, with each camera in the array capturing multiple images as the array rotates. These images can be looking outward along the radials of the cylinder, or alternatively looking tangential to the cylinder. The longitudinal camera array allows the surrounding scene to be captured from multiple different planes that are substantially parallel to the ends of the capture cylinder, allowing for more accurate subsequent rendering of the scene.

According to another aspect, a view of the surrounding scene can be rendered based on the captured images. To render an image for a particular view of the surrounding scene, a viewing position is identified that represents a location from which the surrounding scene is viewed. For each pixel in the image to be rendered the display value for the pixel is determined according to the following. A viewing ray passing through the pixel in a direction of viewing corresponding to the view is determined and is used to determine an intersection point between the viewing ray and the capture cylinder. The intersection point is then used to determine which one or more of multiple longitudinal image arrays in the capture cylinder are relevant to the pixel, and also which one or more of a plurality of image columns in each of the longitudinal image arrays is relevant to the pixel. An elevation angle of the viewing ray is then used to determine which one or more longitudinally adjacent images corresponding to the longitudinal image arrays are relevant to the pixel, and which one or more pixels from the one or more longitudinally adjacent images are relevant to the pixel. The display value of the pixel is then determined, based on the display values of each of the one or more pixels.

According to another aspect, stereo rendering of the surrounding scene is also supported. Stereo rendering allows multiple rendered images to be generated to approximate the viewing of the scene by a pair of eyes. The eye pair is able to move in any of the three dimensions, as well as rotate about any of the three axes. However, in one implementation in which the surrounding scene is described by a capture cylinder, movement of the eye pair is constrained such that neither eye in the eye pair can move outside of the capture cylinder.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

In the discussion below, embodiments of the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, all or part of the invention can be implemented in one or more application specific integrated circuits (ASICs).

Concentric mosaic arrays implemented in this invention are referred to herein, which differ from concentric mosaics. Concentric mosaics describe an image based rendering process that allows a user to move freely within a circular region and observe lateral parallax and lighting changes without any geometric or photometric scene model recovery. Concentric mosaics use only one set of images captured in a single plane of rotation. Concentric mosaic arrays, on the other hand, use additional longitudinally aligned camera positions and thus additional sets of images are captured in multiple longitudinally aligned, and substantially parallel, planes of rotation. Concentric mosaics often result in vertical distortions when viewing from off planar positions. To overcome this problem, concentric mosaic arrays use a series of longitudinally aligned cameras (or camera positions) in place of a single camera to capture an array of mosaics. The off planar viewing rays used in rendering vertical views can be retrieved from the vertical mosaic array of the cameras, resulting in reduced vertical distortions and observing of significant lateral and longitudinal parallax and lighting changes as well.

General System

Figure 1:
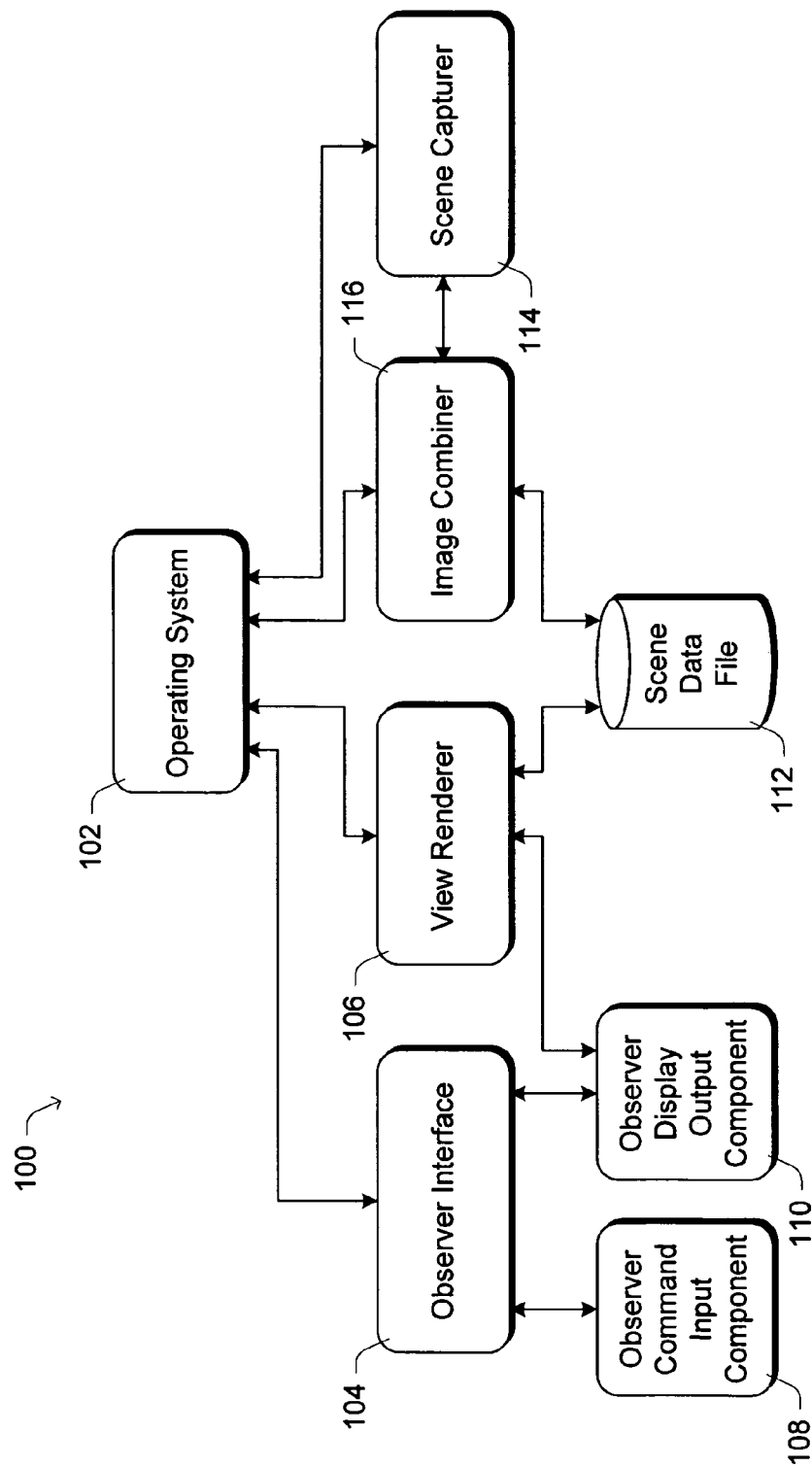
FIG. 1 illustrates an exemplary system for capturing and rendering views of a 3D scene based on a series of images captured by a longitudinally aligned camera array(s) in accordance with certain embodiments of the invention.

FIG. 1 illustrates an exemplary system for capturing and rendering views of a 3D scene based on a series of images captured by a longitudinally aligned camera array(s) in accordance with certain embodiments of the invention. A computing system 100 is illustrated including an operating system 102, an observer interface 104, a view renderer 106, an observer command input component 108, an observer display output component 110, a scene data file 112, a scene capturer 114, and an image combiner 116.

Operating system 102 performs various system level operations to control the lower level functions of the computing system and interaction of the various components 104-116 of system 100. Scene capturer 114 collects a set of images for the 3D scene using a rotating longitudinally aligned camera array(s) (not shown). The camera array motion is constrained to one or more concentric, coplanar circles within the 3D scene, as discussed in more detail below.

Scene capturer 114 provides the set of images it collects to image combiner 116, which in turn generates scene data file 112 by combining (and optionally compressing) the set of images along with index information. Scene data file 112 is stored on a mass storage device that is part of, or coupled to, system 100. Once scene data file 112 is created, system 100 can render and present to a user an image representing a view seen by an observer within the 3D scene maintained in scene data file 112.

View renderer 106 generates the image seen by the observer and outputs the image using display output component 110. View renderer 106 uses various parameters to describe the observer's location and direction of view and uses the parameters, in conjunction with scene data file 112, to generate the image to output to the user. The geometric equations and relationships used to generate these parameters and apply them to scene data file 112 is discussed in more detail below.

The user may move around within the 3D scene by inputting appropriate commands to system 100 through the command input component 108. These commands may correspond to input keystrokes on a keyboard, appropriate movements of a pointing device (such as a joystick, mouse or trackball, virtual reality glove, or other controller), voice based motion commands, etc. These commands translate to a location within the 3D scene and a direction of view of the observer that is presented for viewing by display output component 110. The display of output component 110 will change as if the user moved within the 3D scene.

Figure 2:
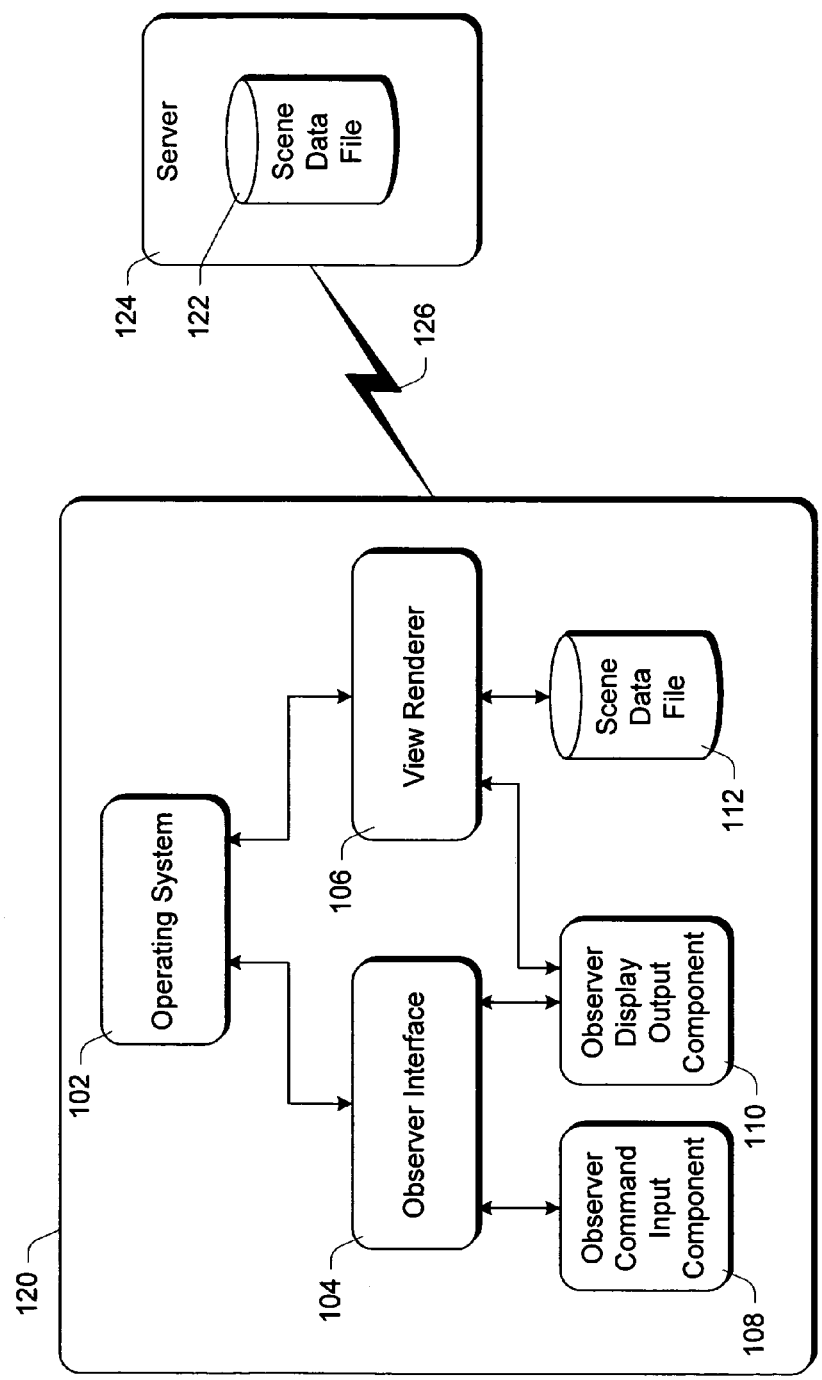
FIG. 2 illustrates another exemplary system in which the image capturing and scene data file generation are not performed by the same computer that performs the rendering.

FIG. 2 illustrates an alternative system in which the image capturing and scene data file generation are not performed by the same computer that performs the rendering. Thus, a computer system 120 can still render views generated from the images captured by a longitudinally aligned camera array(s) even though system 120 does not itself include such an array. Computer system 120 includes the same rendering components as system 100 of FIG. 1 (specifically, observer interface 104, rendered 106, input component 108 and output component 110). However, system 120 does not include a scene capturer or image combiner. Scene data file 112 may be stored locally at system 120, or alternatively a scene data file 122 may be accessed remotely (e.g., from a remote server 124). System 120 can be coupled to server 124 by any of a wide variety of conventional communication channels 126, such as a local area network (LAN), wide area network (WAN), the Internet, direct dial-up connection, etc.

Figure 3:
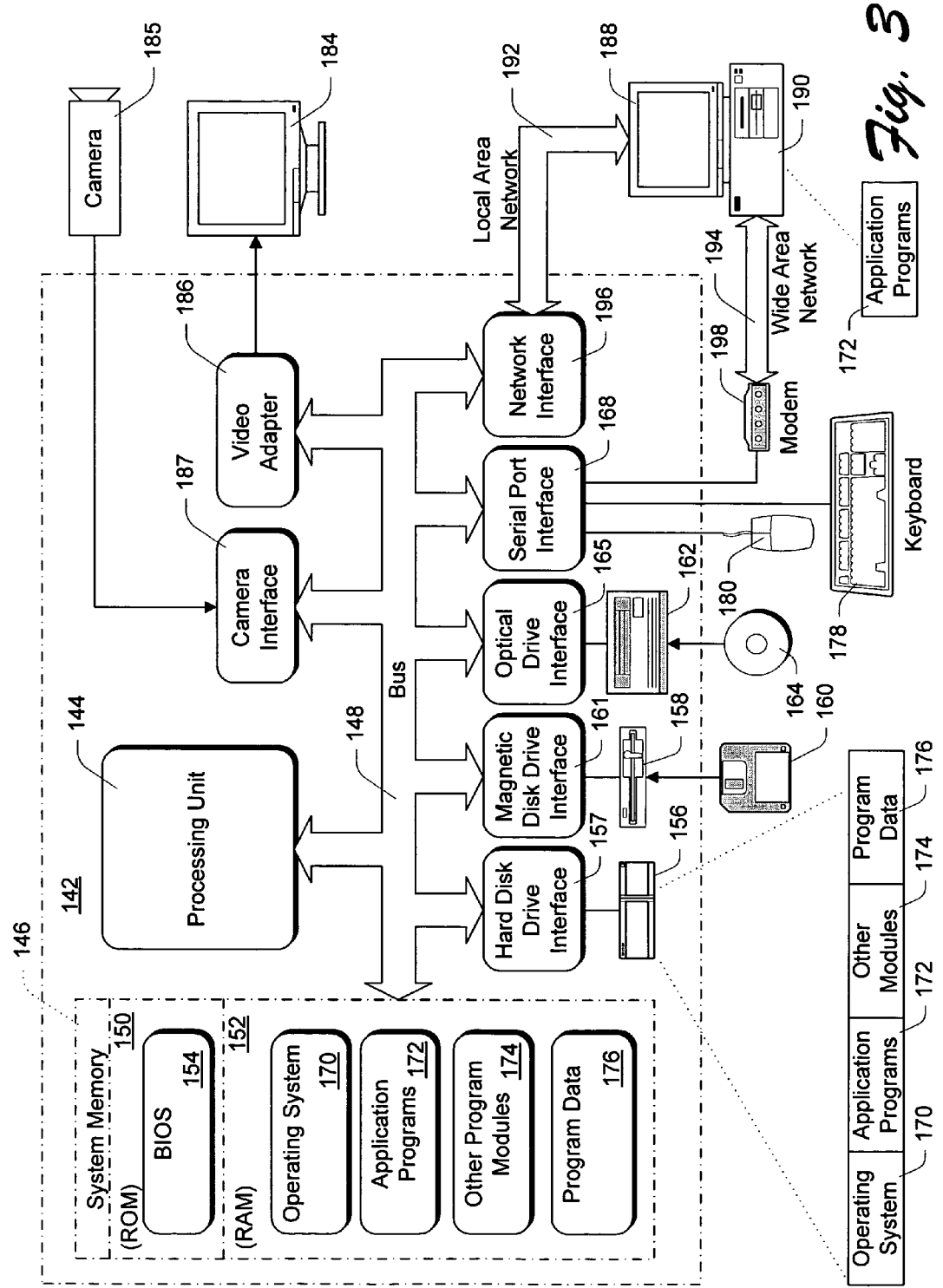
FIG. 3 shows a general example of a computer that can be used in accordance with certain embodiments of the invention.

FIG. 3 shows a general example of a computer 142 that can be used in accordance with certain embodiments of the invention. Computer 142 represents, for example, system 100 of FIG. 1, or either of system 120 or server 124 of FIG. 2. Computer 142 includes one or more processors or processing units 144, a system memory 146, and a bus 148 that couples various system components including the system memory 146 to processors 144. The bus 148 represents one or more of any of several types of bus structures, including a memory bus or memory controller, a peripheral bus, an accelerated graphics port, and a processor or local bus using any of a variety of bus architectures.

The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. Operating system 170 can be any of a variety of operating systems, such as any of the "Windows" family of operating systems available from Microsoft Corporation of Redmond, Wash. A user may enter commands and information into computer 142 through input devices such as keyboard 178 and pointing device 180 (such as a mouse). Other input devices (not shown) may include a microphone, joystick, game pad, satellite dish, scanner, motion tracking devices, virtual reality gloves, controllers, or the like. These and other input devices are connected to the processing unit 144 through an interface 168 (e.g., a serial port, parallel port, game port, or a universal serial bus (USB)) that is coupled to the system bus. A monitor 184 or other type of display device (such as a head mounted display, a 3D video projection, or the like) is also connected to the system bus 148 via an interface, such as a video adapter 186. In addition to the monitor, personal computers typically include other peripheral output devices (not shown) such as speakers and printers.

A camera 185 is also coupled to bus 148 via a camera interface 187. Camera 185 (such as a digital/electronic still or video camera, film/photographic still or video camera, scanner, Charge Coupled Device (CCD) elements, etc.) is capable of capturing a sequence of images or one or more pixels and transmitting the captured images or pixels to RAM 152, or one of the other data storage devices associated with computer 142, via camera interface 187. The coupling of camera 185 to camera interface 187 can be a wired connection (e.g., USB, IEEE 1394, a proprietary connection, etc.) or a wireless connection (e.g., Radio Frequency (RF), Infrared (IR), etc.).

Computer 142 can optionally operate in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 3. The logical connections depicted in FIG. 3 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Scene Capture

Generally, a scene is captured by one or more cameras each capturing multiple images as they rotate within the scene. FIGS. 4 through 8 show exemplary scene capture setups in accordance with certain embodiments of the invention. The composition of image slits captured by one camera in one round is referred to as a "multi-perspective mosaic". A series of multi-perspective mosaics captured by a camera(s) rotating along a series of concentric, coplanar circles are referred to as "concentric mosaics". A series of concentric mosaics captured by a longitudinally aligned camera array(s) are referred to as a "concentric mosaic array". Regardless of the type of capture setup used (e.g., any of those in FIGS. 4-8), the whole of the captured information of the surrounding 3D scene is equivalent. Additionally, the camera rotation is described herein as being circular. Alternatively, different patterns of rotation can be used (e.g., an elliptical or an almost-circular pattern can be used).

Figure 4:
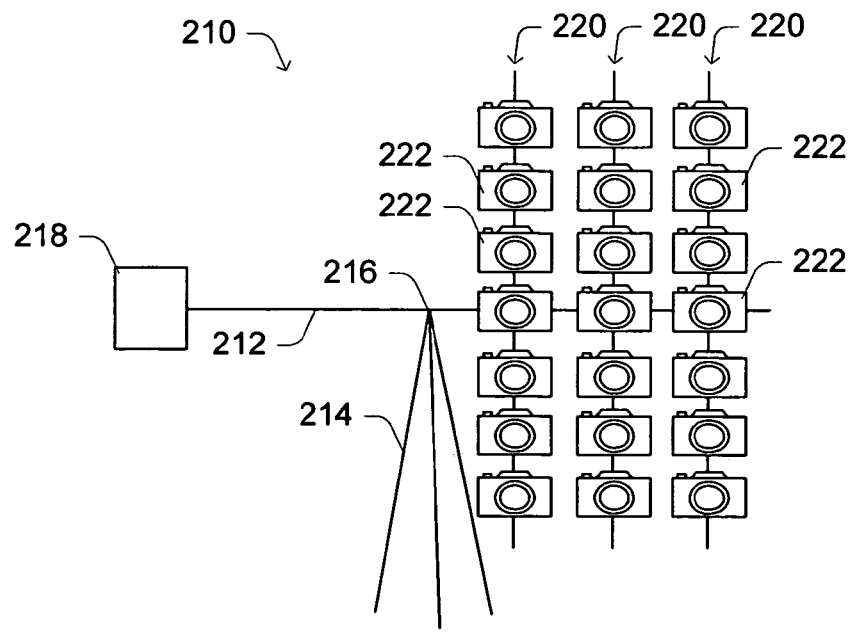
FIGS. 4, 5, 6, 7, and 8 illustrate various exemplary embodiments of the image capture setups in accordance with various embodiments of the invention.

In FIG. 4, a capture system 210 includes a beam 212 rotatably coupled to a support 214, allowing beam 212 to be rotated a full 360 degrees. The location of this coupling defines a center of rotation 216. A counterweight 218 is optionally placed at one end of beam 212 while multiple arrays 220 of cameras 222 are placed at the other end of beam 212. The location and weight of counterweight 218 can vary, depending on support 214, beam 212, and the number and weight of cameras 222. The image arrays are captured while the camera arrays 220 are rotated a full 360 degrees, with the images being captured by cameras 222 along the tangent direction of the circle of rotation. The images captured by each camera 222 are slit images or columns of images (typically one pixel wide). In one implementation, the camera array motion is made continuous and at a uniform speed for the full 360 degrees of rotation.

The arrays 220 are referred to as being "longitudinal" arrays and are substantially perpendicular to the plane that beam 212 rotates in. Beam 212 will frequently rotate in a horizontal plane, resulting in arrays 220 being in a vertical plane. Beam 212, however, can rotate in any plane depending on the positioning and capabilities of support 214.

The cameras 222 can be of any type appropriate for capturing images of the scene. In one implementation, each camera 222 comprises a digital video camera. Alternatively, other types of cameras can be used, such as digital or film still cameras, non-digital video cameras, CCD elements, etc. If cameras 222 generate non-digital pictures, then the images can be digitized in a conventional manner prior to the image combination discussed in more detail below. Furthermore, in the illustrated example all cameras 222 are substantially the same type (e.g., digital video cameras) and typically are the same manufacturer and model. Alternatively, different types, makes, models, etc. of cameras 222 can be included for different arrays and within arrays.

While only a few arrays 220 are shown in FIG. 4, typically many more arrays are included along beam 212. The exact number of arrays to include can vary depending on the scene to be captured, the desired accuracy of the subsequent rendering of the scene, and the desired or available amount of storage space required for the scene data. Typically, the number of arrays 220 ranges from the tens to the thousands. Similarly, while only a few cameras 222 are shown in FIG. 4, typically many more cameras are included in each array 220. The exact number of cameras to include can also vary depending on the scene to be captured, the desired accuracy of the subsequent rendering of the scene, the desired vertical field of view for the observer when rendering the scene, the radius of the circle defined by the outermost array 220 (the array furthest from center of rotation 216) as beam 212 rotates, and the desired or available amount of storage space required for the scene data. Typically, the number of cameras ranges from the tens to the thousands.

Figure 5:
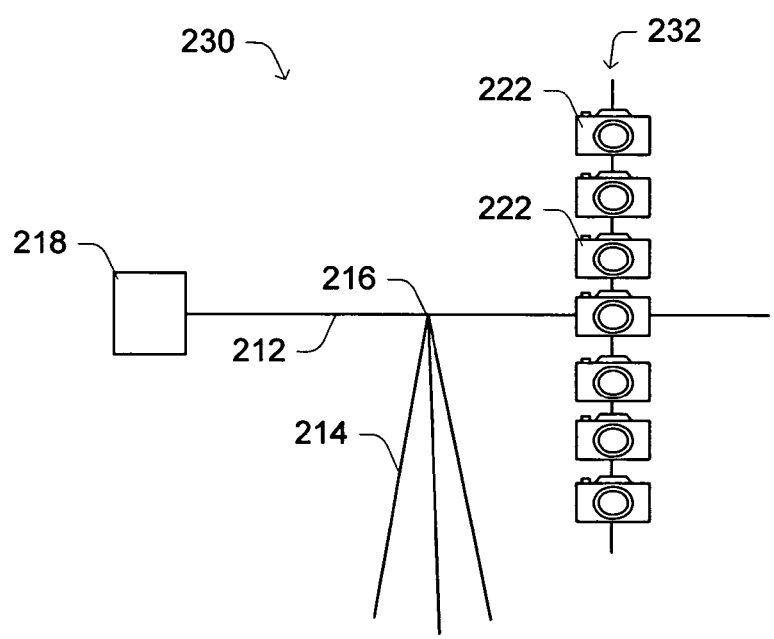

In FIG. 5, a capture system 230 includes a beam 212, support 214, center of rotation 216, and counterweight 218 analogous to capture system 210 of FIG. 4. However, system 230 differs from system 210 in that only a single array 232 of cameras 222 is attached to beam 212. The array 232 can be moved to different locations along beam 212 and beam 212 rotated a full 360 degrees to capture images for different circles (all concentric with the circle of rotation). Array 232 can be attached to beam 212 in any of a wide variety of conventional manners, providing for automated or manual movement of array 232 along beam 212. Alternatively, two or more movable arrays 232 may be attached to beam 212.

Figure 6:
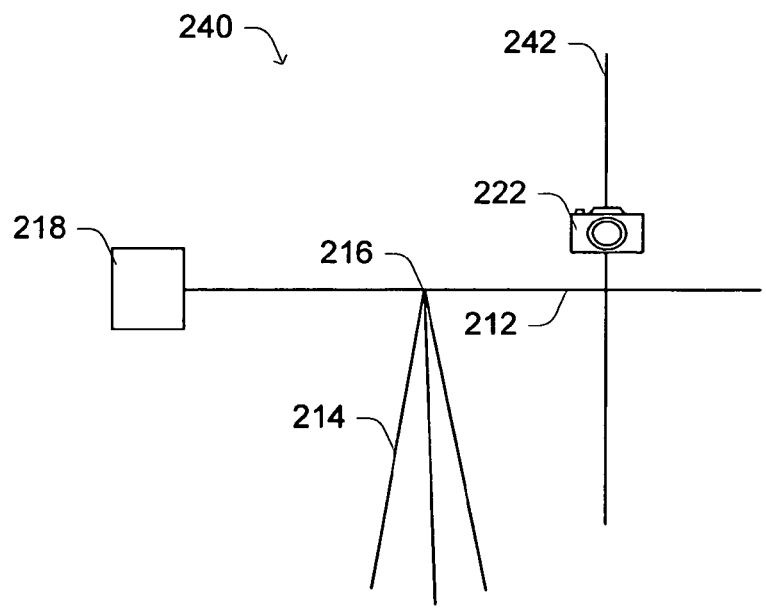

In FIG. 6, a capture system 240 includes a beam 212, support 214, center of rotation 216, and counterweight 218 analogous to capture system 230 of FIG. 5. However, system 240 differs from system 230 in that only a single camera is mounted to a longitudinal array bar 242. Camera 222 can be moved to different locations along array bar 242 and beam 212 rotated a full 360 degrees to capture images for circles at different longitudinal levels. Additionally, array bar 242 can be moved to different locations along beam 212 and beam 212 rotated a full 360 degrees to capture images for different circles (all concentric with the circle of rotation). Camera 222 can be mounted to array bar 242, and array bar 242 mounted to beam 212, in any of a variety of conventional manners, providing for automated or manual movement of camera 222 along array bar 242 and array bar 242 along beam 212. Alternatively, two or more cameras 222 and/or two or more array bars 242 may be included in system 240.

Figure 7:
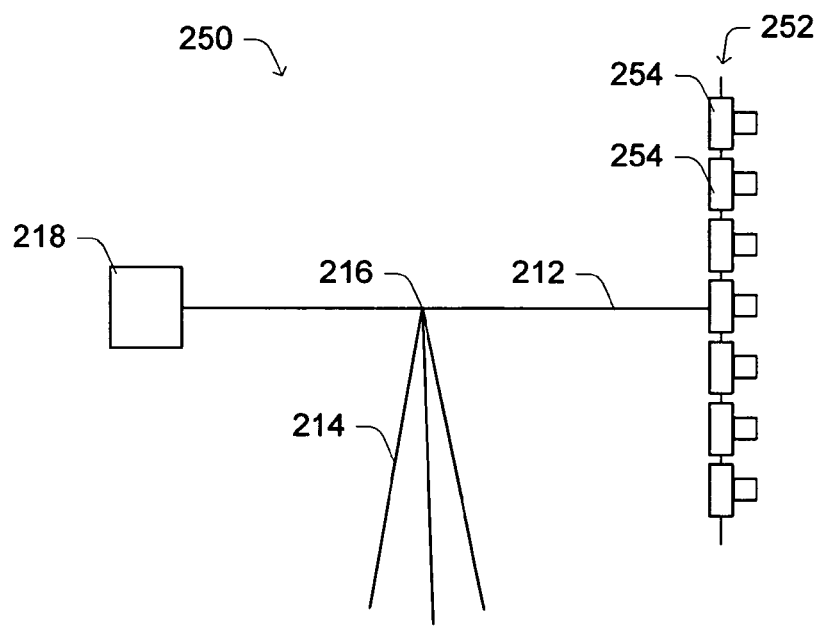

In FIG. 7, a capture system 250 includes a beam 212, support 214, center of rotation 216, and counterweight 218 analogous to capture system 230 of FIG. 5. However, system 250 differs from system 230 in that camera array 252 is mounted at the end of beam 212, array 252 does not move along beam 212, and images are captured by cameras 254 along the radial direction of the circle of rotation of beam 212. Additionally, cameras 254 capture "whole area" images rather than the slit images captured by cameras 222 in FIGS. 4-6. This whole area image refers to a wider angle of capture such as a 45 degree or 180 degree field of capture.

Depending on the types of cameras 254 that are used, the individual cameras may not provide a sufficient field of capture. In such situations, multiple cameras could be used in place of each camera 254, or each camera 254 may be moved to capture multiple images that can be combined to create a capture image with a wider field of view.

Figure 8:
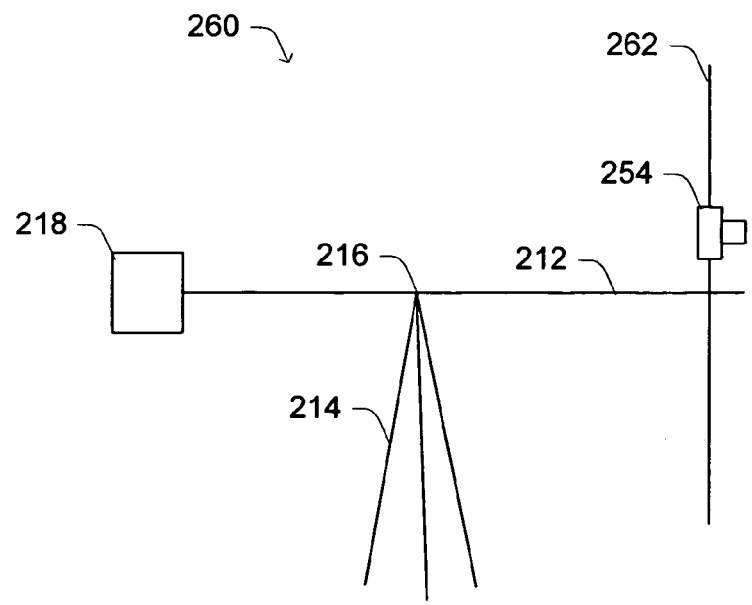

In FIG. 8, a capture system 260 includes a beam 212, support 214, center of rotation 216, and counterweight 218 analogous to capture system 250 of FIG. 7. However, system 260 differs from system 250 in that only a single camera 254 is mounted to a longitudinal array bar 262. Camera 254 can be moved to different locations along array bar 262 and beam 212 rotated a full 360 degrees to capture images for circles at different longitudinal levels. Camera 254 can be mounted to array bar 262 in any of a variety of conventional manners, providing for automated or manual movement of camera 254 along array bar 262. Alternatively, two or more cameras 254 may be attached to array bar 262.

Returning to FIG. 7, a latitudinally (e.g., horizontally) oriented plane defined by the circular region swept out by rotating the beam 212 a full 360 degrees is referred to as a "capture circle" and the plane of the capture circle is referred to as a "capture plane". The longitudinally aligned camera array 252 also sweeps out a cylindrical three-dimensional area, referred to as a "capture cylinder". To illustrate the capture setup in additional detail, the configuration and parameters of the capture setup illustrated in FIG. 7 are described in more detail below. However, it is to be appreciated that other capture setups can also be used, such as those illustrated in FIGS. 4, 5, 6, and 8.

Figure 9:
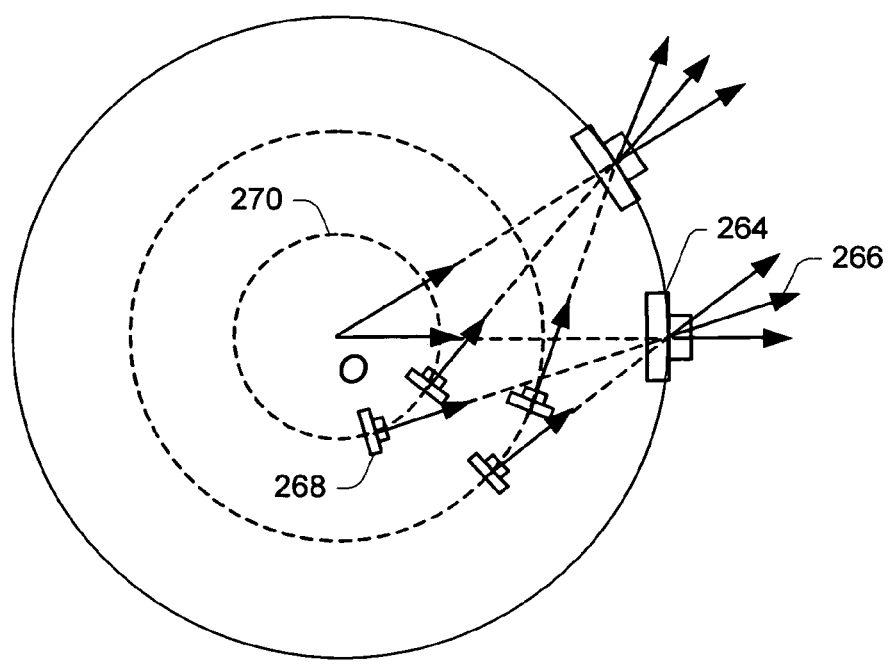
FIG. 9 illustrates the equivalency between the captured scene data of the capture setups in FIGS. 7 and 8, and the capture setups in FIGS. 4, 5 and 6.

FIG. 9 illustrates that the captured scene data of the capture setups in FIGS. 7 and 8, in which each camera captures a whole image when it is pointed along the radial direction, is equivalent to those of the capture setups in FIGS. 4, 5 and 6, in which each camera captures a set of image slits (columns) when it is tangential to the circle. In FIG. 9, for each column of the image captured by the camera that is pointed along the radial direction there exists a certain camera that is tangential to a certain circle and captures the same image slit (column) (or alternatively the column can be generated by interpolation based on two tangential cameras). By way of example, a column of the image captured by camera 264 in the direction of ray 266 is the same as the slit (column) captured by camera 268 on circle 270. Therefore we need only consider one of these conditions.

Figure 10:
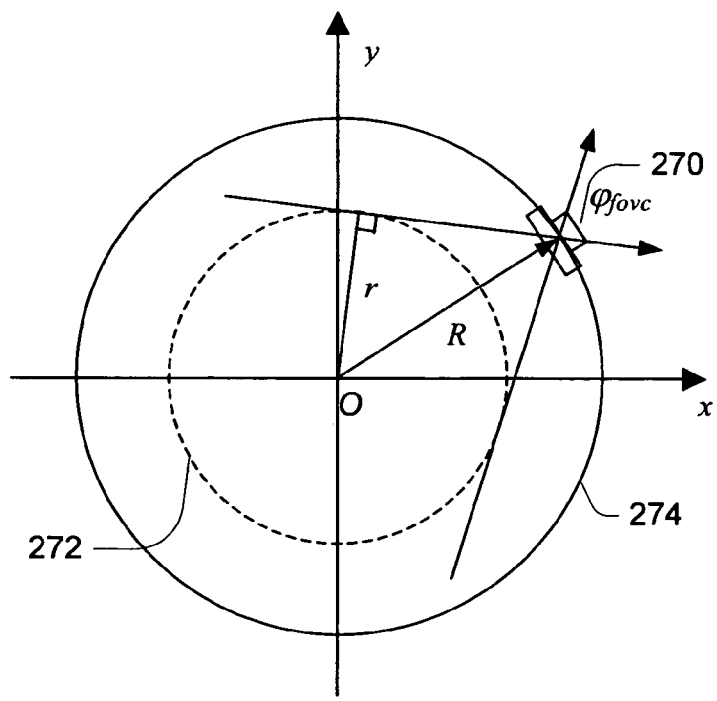
FIG. 10 illustrates an exemplary top view of the capture setup of FIG. 7 in accordance with certain embodiments of the invention.
Figure 11:
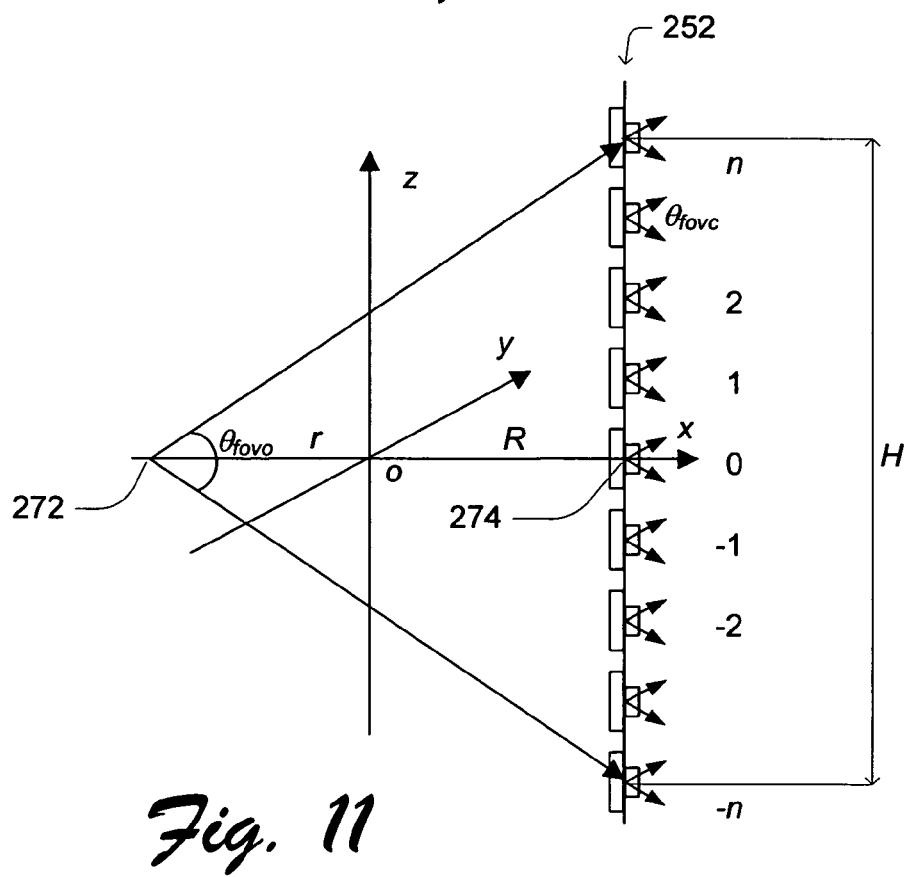
FIG. 11 illustrates an exemplary side view of the capture setup of FIG. 7 in accordance with certain embodiments of the invention.

Capture setup 250 of FIG. 7 is discussed in more detail with reference to FIGS. 10 and 11. FIG. 10 illustrates an exemplary top view of capture setup 250 in accordance with certain embodiments of the invention, while FIG. 11 illustrates longitudinal camera array 252 in more detail in accordance with certain embodiments of the invention. In FIG. 10, the radius r of a circle 272 in which users can freely move and view the surrounding scene depends on both the lateral field of view $\phi_{fovc}$ of the capture camera 270 and the radius R of the capture circle 274. It is expressed as:

$$r = R\sin\left(\frac{\varphi_{fovc}}{2}\right) \quad (5)$$

Any ray that originates from a viewpoint within the circle 272 and passes through the capture camera 270 is within the field of view of the capture camera 270. Therefore, any view of the user can be reproduced from the captured images. This circle 272 is referred to as a "wandering circle".

Each camera captures images uniformly m times in a circle, the ith image of each camera is captured at angle $360i/m$ degrees, where i is an integer and $1 \leq i \leq m$. The number m depends on the lateral resolution $w_o$ of the image of the observer's view and the lateral field of view $\phi_{fovo}$ of the observer. In one implementation, each column of the image of the observer's view corresponds to each capture position of the camera array on the capture circle, therefore we have, $$m \approx \frac{360 w_o}{\varphi_{fovo}} \quad (6)$$

For instance, in the situation that $w_o=320$ and $\phi_{fovo}=45$ degree, m=2560.

In FIG. 11, longitudinal array 252 includes a total of (2n+1) cameras. The cameras are numbered as $-n, -(n-1), \ldots, -1, 0, 1, \ldots, (n-1), n$ from bottom to top. The height H of the camera array 252 should be so designed that the longitudinal field of view $\theta_{fovo}$ of the observer is still covered by the camera array 252 even if he (or she) is located at the far end of the wandering circle 272 (i.e., 180 degrees along the circle 274 from where the longitudinal array 252 is currently located). We have, $$H \geq 2(r+R)\tan\left(\frac{\theta_{fovo}}{2}\right) \quad (7)$$

On the other hand, the longitudinal field of view $\theta_{fovo}$ of the observer should not be larger than the longitudinal field of view $\theta_{fovo}$ of the capture camera, i.e., $$\theta_{fovo} \leq \theta_{fovc} \quad (8)$$

otherwise the viewing rays that exceed the longitudinal field of view of the capture camera cannot be reproduced from the captured images. Assuming that the longitudinal resolution of the image of the observer's view is $h_o$, in one implementation the longitudinal interval $d_c$ between adjacent cameras in the array is $$d_c = \frac{2(r+R)\tan\left(\frac{\theta_{fovo}}{2}\right)}{h_o} \quad (9)$$

Returning to FIG. 11, after the images are captured they are imported to the computer, such as computer system 100 of FIG. 1. This importing can be done after all images for the capture circle or capture cylinder are captured, or alternatively as images are captured.

Initially, image combiner 116 of FIG. 1 combines images captured by camera array 252 at the same rotation angle. The resultant image which has a height of 2n+1 times that of a captured camera image (that is, the height of an image captured by a camera 270 in array 252) will hereinafter be referred to as a "high image". In the illustrated example, the captured images are combined by concatenating the data from each image. Some of this data may optionally not be stored, as discussed in more detail below.

Next, image combiner 116 compresses the high images into a scene data file. In one implementation, a conventional vector quantization method is used for the compression process, such as that described in A. Gersho and R. M. Gray, *Vector Quantization and Signal Compression*, Kluwer Academic Publishers, 1992. In this method, a vector of samples is quantized to one of a number of predetermined reproduction vectors. A reproduction vector is called a codeword, and the set of codewords available to encode a source is called the codebook. Codebooks are constructed during a training phase in which the quantizer is asked to find a set of codewords that best approximates a set of sample vectors, called the training set. The quality of a codeword is typically characterized using mean-squared error, i.e. the sum over all samples in the vector of the squared difference between the source sample and the codeword sample. Once a codebook has been constructed, encoding consists of partitioning the source into vectors and finding for each vector the closest approximating codeword from the codebook. Decoding consists of looking up indices in the codebook and outputting the codewords found there—typically a very fast operation. The output of vector quantization is a sequence of fixed rate codebook indices. Each index is log N bits where N is the number of codewords in the codebook, so the compression rate of the quantizer is (kl)/(log N) where k is the number of elements per vector (i.e. the dimension), and l is the number of bits per element, usually 8. Alternatively, other conventional compression processes (such as MPEG4) could be used (e.g., those providing fast decoding and random accessing). Additionally, according to other alternatives, such compression is not performed.

Figure 12:
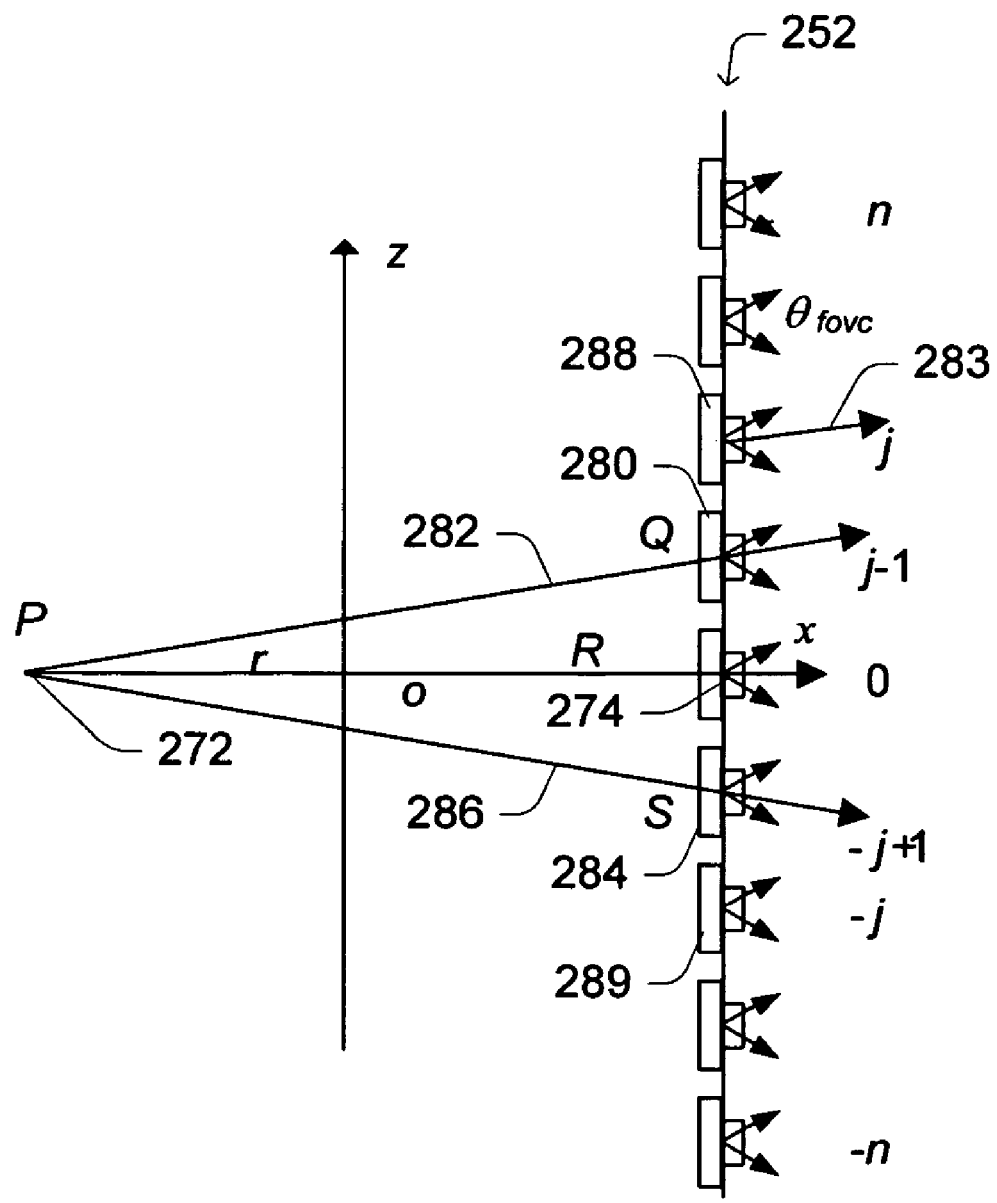
FIG. 12 illustrates which portions of captured images of each camera need not be stored in accordance with certain embodiments of the invention.

Additionally, in some situations it is not always necessary for image combiner 116 to store all of the data captured from each camera in array 252. Such situations can arise, for example, because certain portions of the captured images may never need to be used during rendering. FIG. 12 is an exemplary illustration of how the amount of data stored from each captured image can be reduced in certain embodiments of the invention. If the observer is only permitted to move in a circular region on a plane (e.g., the capture plane), then the portion of the image captured by a camera that needs to be stored depends on the distance between the camera and the plane the observer moves on (e.g., the capture plane). For example, for camera 288, a straight line 282 can be drawn between the farthest point P on the wandering circle 272 and the center Q of camera 280. Only the portion of the image from camera 288 within the angle between direction PQ (line 282, which is parallel to line 283) and the upper limit of the longitudinal field of view of camera 288 needs to be stored. By way of another example, for camera 289, a straight line 286 can be drawn between the point P and the center S of camera 284. Only the portion of the image from camera 289 within the angle between direction PS (line 286) and the lower limit of the longitudinal field of view of camera 289 needs to be stored. The corresponding elevation angles of the boundary lines are $$\arctan\left(\frac{(j-1)d_c}{(r+R)}\right)$$

and $\theta_{fovc}/2$ for cameras with j>0, or $$\arctan\left(\frac{(j+1)d_c}{(r+R)}\right)$$

and $-\theta_{fovc}/2$ for cameras with j<0.

Note that for camera j with j=0, the whole area of the captured image is stored.

It can thus be seen that the farther away a camera is from the capture plane, the fewer are the image rows that need to be stored. Thus the amount of captured data as a 4D plenoptic function is effectively reduced to the amount of an approximate 3.5D plenoptic function, which significantly reduces the data size without sacrificing any 3D parallaxes. Contrasting with concentric mosaics, this concentric mosaic array system eliminates vertical distortions and displays significant longitudinal parallax and lighting changes.

Alternatively, rather than reducing the amount of a captured image that is stored, the actual capture image could be adjusted. By way of example, camera 288 may be configured to capture only the portion of the scene within the angle between direction PQ (line 282) and the upper limit of the longitudinal field of view of camera 288.

Figure 13:
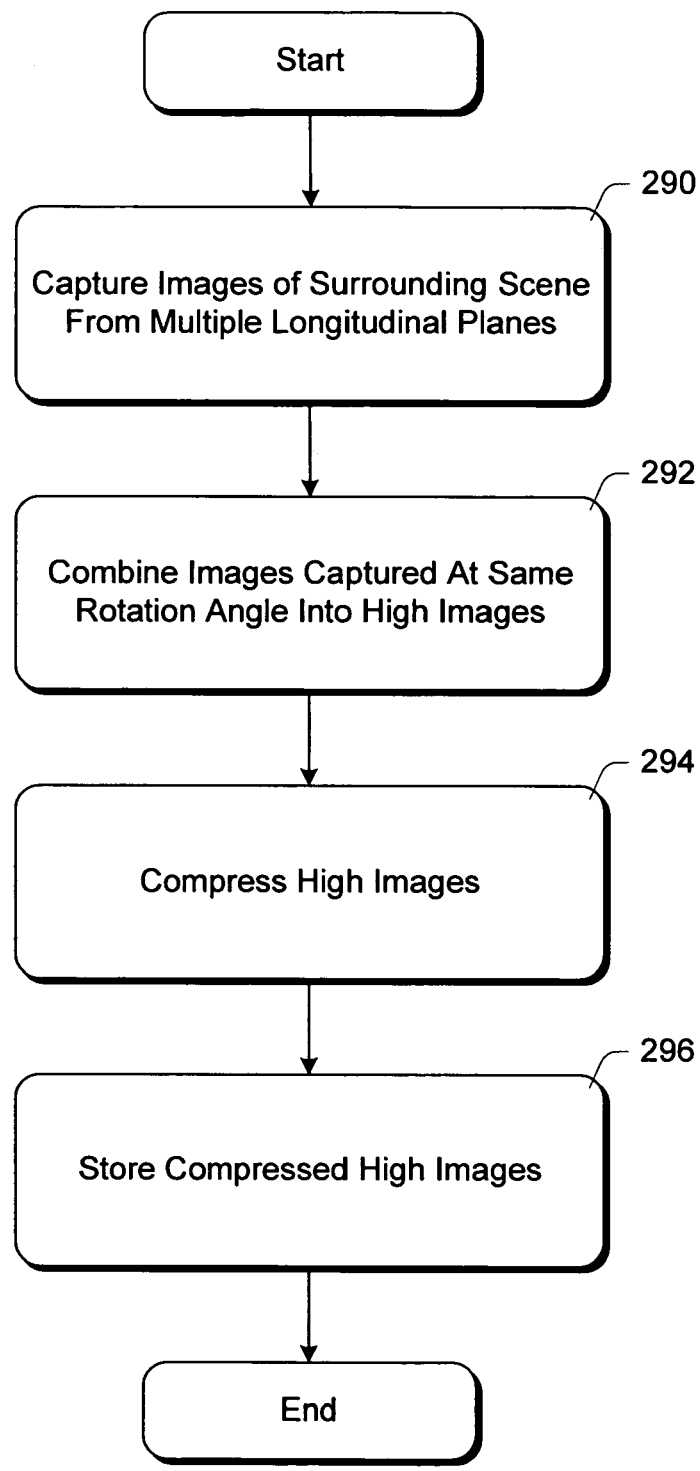
FIG. 13 is a flowchart illustrating an exemplary process for capturing and storing a surrounding scene in accordance with certain embodiments of the invention.

FIG. 13 is a flowchart illustrating an exemplary process for capturing and storing a surrounding scene in accordance with certain embodiments of the invention. The process of FIG. 13 is implemented by, for example, a system 100 of FIG. 1, and may be performed in software.

Initially, images of the surrounding scene are captured from multiple longitudinal planes (act 290). For each rotation angle at which images are captured, the images captured at that rotation angle are combined into a high image (act 292). The high images are then compressed (act 294) and stored as a scene data file (act 296).

The process of capturing images of a surrounding 3D scene described above refers to capturing images of a real scene using cameras. Alternatively, "capture" images can be generated synthetically using any of a wide variety of conventional graphics programs capable of producing a 3D scene such as Maya from Silicon Graphics, Inc. of Mountain View, Calif., Softimage from Avid Technology, Inc. of Tewksbury, Mass., 3D Studio Max from Autodesk Inc. of San Rafael, Calif., etc. These programs can be employed to generate images of the desired dimensions, which depict a portion of a surrounding synthetic 3D scene, from a perspective that is radial to a circle on a circle plane disposed within a synthetic 3D scene. Accordingly, it is to be understood that the "captured images" referred to herein could refer to either real images or synthetic images.

Image Rendering

Once the longitudinal arrays of images have been captured, views of the 3D scene can be rendered based on these captured images. This section addresses rendering mono (single view point) views of the 3D scene, with sub-sections addressing 2D observer freedom of movement and 3D observer freedom of movement. The rendering of stereo views of the 3D scene is discussed in more detail in a subsequent section.

Generally, the values for pixels in a rendered image are generated by extending a ray from the observer's position in the viewing direction to the capture cylinder to determine which captured pixels to base the pixels of the rendered image on. If a sufficient number of image arrays have been created, then most of the rays associated with a view of the captured scene will coincide with respective rays representing the location of the previously captured image arrays. The rays that do not coincide with a ray representing the location of one of the captured image arrays can be interpolated from the captured images to generate a value for the pixel in the rendered image.

2D Observer Freedom of Movement

In this sub-section, rendering of views when the observer is permitted to move in a circular region on the capture plane (or alternatively another viewing plane substantially parallel to the capture plane) is described. The capture plane refers to the plane in which the beam supporting the camera(s) rotates (e.g., beam 212 of FIGS. 4-8). Such rendering of views is described below with reference to FIGS. 14-20.

Figure 14:
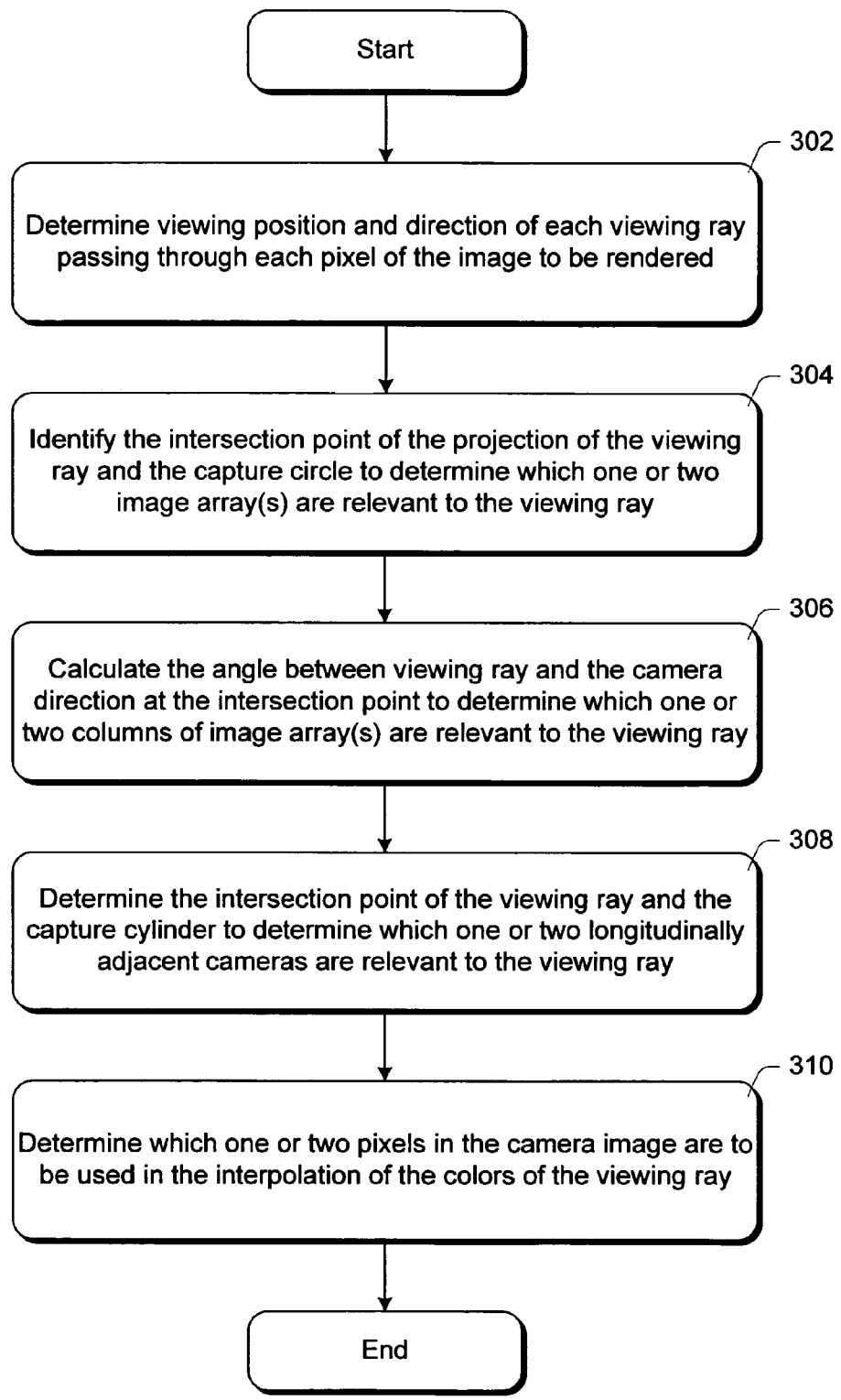
FIG. 14 is a flow diagram illustrating a rendering process for a view of an observer in accordance with certain embodiments of the present invention.

FIG. 14 is a flowchart illustrating an exemplary process for rendering of views when the observer is limited to 2D freedom of movement in accordance with certain embodiments of the invention. The process of FIG. 14 is implemented by a system 100 of FIG. 1 or 120 of FIG. 2, and may be performed in software.

Initially, a viewing ray is determined for each pixel in the image to be rendered based on both the viewing position of the observer and the direction of view of the observer (act 302). For each such viewing ray, the intersection point of the projection of the viewing ray and the capture circle on the capture plane is identified (act 304). This intersection point indicates which image array is relevant to the viewing ray (or which two adjacent image arrays are relevant and should be used in subsequent interpolation). The interpolation weights for two adjacent image arrays are determined according to the distances between the intersection point and the capture positions of these two image arrays, as discussed in more detail below.

Then, according to the horizontal angle between the viewing ray and the camera direction at the intersection point, a determination is made as to which one image column in the image array(s) has a corresponding viewing direction nearest to the direction of the viewing ray (or which two adjacent image columns have corresponding viewing directions nearest to the direction of the viewing ray and should be used in subsequent interpolation) (act 306). The interpolation weights of two adjacent image columns are determined by the differences of the angles, as discussed in more detail below.

Next, according to the elevation angle of the viewing ray, the intersection point of the viewing ray with the longitudinal camera array is calculated (act 308). This intersection point indicates which camera is relevant to the viewing ray (or which two adjacent cameras in the array should be involved in the later interpolation). The interpolation weights of two adjacent cameras are determined according to the distances between the intersection point and the longitudinal positions of the two cameras, as discussed in more detail below. Finally, according to the elevation angle of the viewing ray, a determination is made as to which pixel is to be used as the color or display value of the pixel in the rendered image (or which two pixels of the image column with their corresponding angles nearest to the elevation angle of the viewing ray should be used in the interpolation) (act 310). The interpolation weights of two pixels are determined by the differences of the angles, as discussed in more detail below. The colors of pixel of the rendered image are interpolated by the colors of these pixels, which are retrieved from the compressed scene data file.

In one implementation, a set of basic parameters for rendering images is defined as follows:

$h_c$: the height of the image captured by the camera.

$w_c$: the width of the image captured by the camera.

$\theta_{fovc}$: the longitudinal field of view of the capture camera.

$\phi_{fovc}$: the lateral field of view of the capture camera.

$\alpha_c$: the aspect ratio of the image pixel of the capture camera.

$h_o$: the height of the image of the observer's view.

$w_o$: the width of the image of the observer's view.

$\theta_{fovo}$: the longitudinal field of view of the observer.

$\phi_{fovo}$: the lateral field of view of the observer.

$\alpha_o$: the aspect ratio of the image pixel of the observer's view.

Note the relationship between the aspect ratios and other quantities are:

$$\alpha_c = \frac{h_c \tan\left(\frac{\varphi_{fovc}}{2}\right)}{w_c \tan\left(\frac{\theta_{fovc}}{2}\right)} \tag{10}$$

and $$\alpha_o = \frac{h_o \tan\left(\frac{\varphi_{fovo}}{2}\right)}{w_o \tan\left(\frac{\theta_{fovo}}{2}\right)} \tag{11}$$

Figure 15:
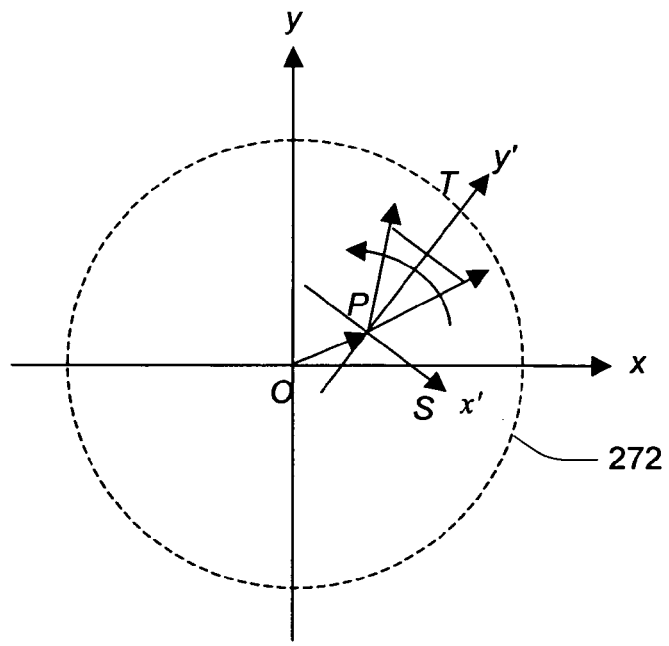
FIG. 15 illustrates an exemplary local coordinate system of an observer and an exemplary wandering circle in which the observer may move in accordance with certain embodiments of the invention.

FIG. 15 illustrates an exemplary local coordinate system of an observer within the wandering circle 272 in which the observer's point of view may move in two dimensions. T and P are each two-dimensional vectors. The current viewing position and viewing direction measured in the global coordinate system are P and T respectively. T is along the local axis y', and the direction of local axis x' measured in the global coordinate system is denoted by S. Thus, $$S_x = \cos(\pi/2)T_x + \sin(\pi/2)T_y = T_y \quad (12)$$

$$S_y = -\sin(\pi/2)T_x + \cos(\pi/2)T_y = -T_x \quad (13)$$

where $S_x$ and $S_y$ are x and y coordinates of direction S (normalized), and $T_x$ and $T_y$ are x and y coordinates of direction T measured in the global coordinate system.

Certain movement within the wandering circle 272 can be described by assuming that the translation rates in each dimension of the plane are $\Delta x'$ and $\Delta y'$ respectively. For movement to the left, the new viewing position becomes, $$P_{new} = P - \Delta x' S \quad (14)$$

For movement to the right, the new viewing position becomes, $$P_{new} = P + \Delta x' S \quad (15)$$

For movement forwards, the new viewing position becomes, $$P_{new} = P + \Delta y' T \quad (16)$$

For movement backwards, the new viewing position becomes, $$P_{new} = P - \Delta y' T \quad (17)$$

In certain embodiments, a restriction on movement is that the new position be within the wandering circle (i.e., the norm of the position vector must be less than the radius of the wandering circle r).

Rotational movement within the wandering circle 272 can be described by assuming that the rotation rate of the viewing direction corresponding to left or right rotation is $\Delta \phi$. For rotation to the left (counterclockwise in the local coordinate system) the new viewing direction becomes, $$T_{xnew} = T_x \cos(\Delta\phi) - T_y \sin(\Delta\phi) \quad (18)$$

$$T_{ynew} = T_x \sin(\Delta\phi) + T_y \cos(\Delta\phi) \quad (19)$$

For rotation to the right (clockwise in the local coordinate system) the new viewing direction becomes, $$T_{xnew} = T_x \cos(\Delta\phi) - T_y \sin(\Delta\phi) \quad (20)$$

$$T_{ynew} = -T_x \sin(\Delta\phi) + T_y \cos(\Delta\phi) \quad (21)$$

Zooming within the wandering circle 272 can be described by assuming that the corresponding increment of the longitudinal field of view of a zoom-out command or the corresponding decrement of the longitudinal field of view of a zoom-in command is $\Delta\theta_{fovo}$. For zooming out, the longitudinal field of view of the observer becomes, $\theta_{fovo} + \Delta\theta_{fovo}$ but does not exceed $\theta_{fovc}$. The lateral field of view of the observer can be deduced according to equation (11) above. For zooming in, the longitudinal field of view of the observer becomes, $\theta_{fovo} - \Delta\theta_{fovo}$. Note that the longitudinal field of view $\theta_{fovo}$ should be greater than 0 degrees, and depends on the tolerance of the image resolution (typically $\theta_{fovo}$ is on the order of 10 to 30 degrees).

The changing of viewing position and viewing direction when different motion commands are issued is described above. Given the viewing position P, viewing direction T, and longitudinal field of view $\theta_{fovo}$ of the observer, an exemplary rendering process is described in further detail below.

Figure 16:
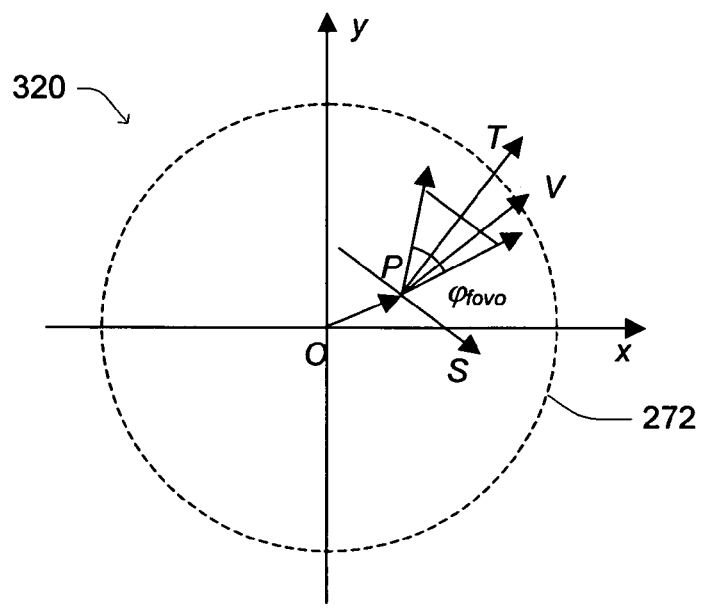
FIG. 16 illustrates an exemplary viewing ray of an observer on the capture plane in accordance with certain embodiments of the invention.

By way of example, consider the capture plane 320 illustrated in FIG. 16. In capture plane 320, the normalized projection vector V of the viewing ray that is originated from the observer in the viewing direction T and passes through the kth column of the view image of the observer (the view to be rendered) is $$V = \text{normalize}\left(T + g \times \left(k - \frac{w_o}{2} - \frac{1}{2}\right)S\right) \quad (22)$$

where the quantity g is defined as:

$$g = \frac{\tan\frac{\varphi_{fovo}}{2}}{\frac{w_o}{2}} \quad (23)$$

Figure 17:
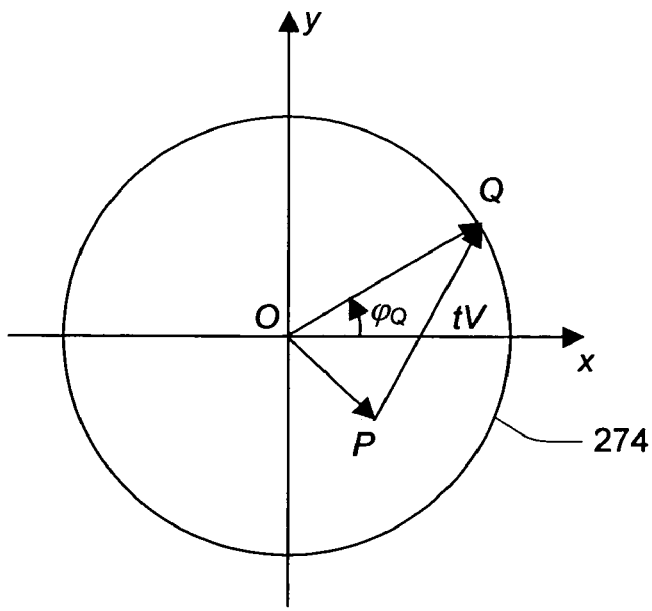
FIG. 17 illustrates an exemplary determination of the capturing angle for one of the viewing rays of an observer in accordance with certain embodiments of the invention.

Here it is assumed that the width $w_o$ of the image of the observer's view (the image being rendered) is even. FIG. 17 illustrates the determining of the capture angle $\phi_Q$ for this viewing ray. The capture angles refer to the rotation angles of the camera array at the time when images are captured. The intersection point Q of the projection V of the viewing ray with the capture circle is determined by the equation:

$$\|P + tV\| = R \quad (24)$$

that is $$(x_P + tx_v)^2 + (y_P + ty_v)^2 = R \quad (25)$$

Note that the positive root of t should be used (where t is the length of the segment PQ). The angle $\phi_Q$ of intersecting point Q is obtained as follows:

If $y_Q \geq 0$, then $$\phi_Q = \arccos(x_Q) \quad (26)$$

otherwise $$\phi_Q = 2\pi - \arccos(x_Q) \quad (27)$$

A number $m_\phi$ is also now used, with, $$m_\phi = m\phi_Q/2\pi \quad (28)$$

The integer part of $m_\phi$ is denoted by $m_-$, $$m_- = int(m_\phi) \quad (29)$$

If $m_\phi = m_-$ (i.e., $m_\phi$ is an integer) then the $m_\phi$th high image is considered in the retrieving of image columns from the compressed scene data file. Otherwise, the two high images with their capture angles nearest $\phi_Q$ are considered. Assume that the indexes of the high images corresponding to the nearest capture angles which are less and greater than the angle $\phi_Q$ are $m_-$ and $m_+$ respectively. If $m_- < m$, then $m_+ = m_- + 1$, otherwise $m_+ = 1$ (i.e., the angle $\phi_Q$ is between the capture angles of high images m and 1).

So the $m_-$th and $m_+$th high images are considered in the retrieving of image columns from the compressed scene data file. The weights of the two high images in the future interpolation are $[1-(m_\phi - m_-)]$ and $(m_\phi - m_-)$ respectively.

After the indexes of the high images that correspond to the viewing ray of an observer are found, a further determination is made as to which column(s) in the high image correspond to the viewing ray.

Figure 18:
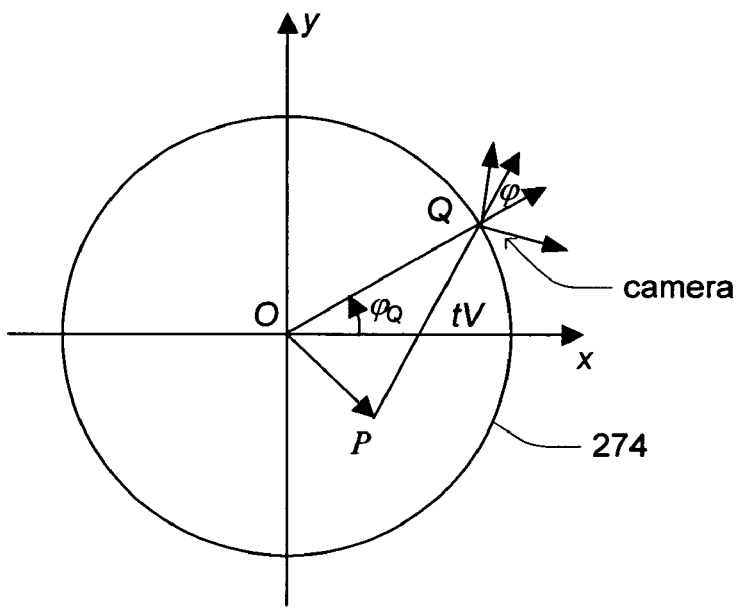
FIG. 18 illustrates an exemplary determination of the angle of the projection of a viewing ray relative to the camera direction at the intersection point in accordance with certain embodiments of the invention.

FIG. 18 illustrates a determination of the angle (between the projection of a viewing ray and the camera direction. The angle $\phi$ at intersection point Q equals $(\phi_v - \phi_Q)$.

A number $l_\varphi$ is now used, with, $$l_\varphi = \frac{w_c \tan(\varphi)}{\tan\left(\frac{\varphi_{fovc}}{2}\right)} + \frac{w_c + 1}{2} \qquad (30)$$

The integer part of the number $l_\varphi$ is denoted by $l_-$, $$l_- = int(l_\varphi) \qquad (31)$$

If $l_\varphi = l_-$ (i.e., $l_\varphi$ is an integer) or $l_\varphi = w_c$, only the $l_\varphi$th column of the image is retrieved, otherwise a number $l_+$ is introduced, $$l_+ = l_- + 1 \qquad (32)$$

So, the $l_-$th and $l_+$th columns of the image are retrieved. Their interpolation weights are $[1-(l_\varphi-l_-)]$ and $(l_\varphi-l_-)$ respectively.

After determining which column(s) in the high image(s) are relevant in the rendering of the viewing ray, a determination is made as to which pixels in the column(s) correspond to the viewing ray.

As described previously, the high image is combined by images captured by the camera array at the same capture angle. In order to find out the corresponding pixels in the columns, a determination is first made as to which camera(s) in the longitudinal array(s) are mostly relevant to the viewing ray.

Figure 19:
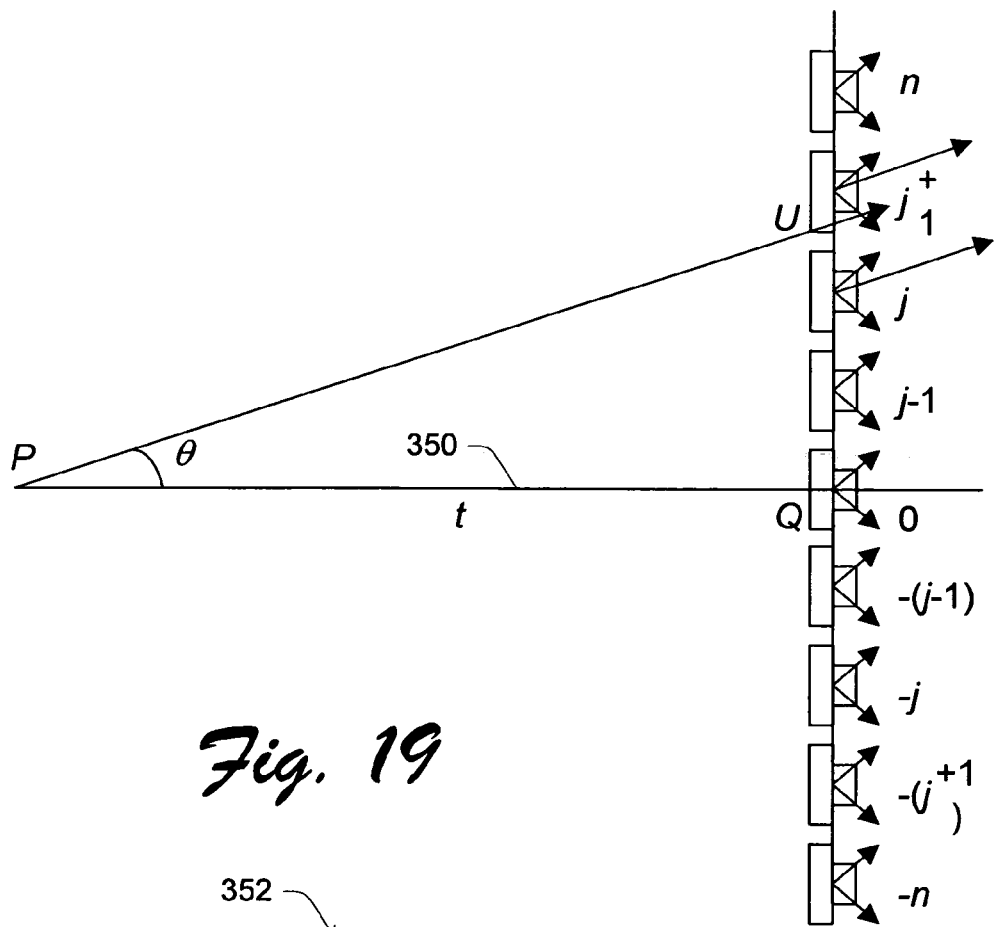
FIG. 19 illustrates an exemplary side view of the intersection of a viewing ray with the camera array in accordance with certain embodiments of the invention.

FIG. 19 illustrates a side view of the intersection of a viewing ray 350 with the camera array. As calculated above, the distance between the viewing point P and the horizontal intersecting point Q at the capture circle is t. The elevation angle $\theta$ of the viewing ray 350 corresponding to the sth pixel of the kth column of the image of the observer's view is $$\theta = \arctan\left(\frac{\frac{s - \frac{h_o}{2} - \frac{1}{2}}{\frac{h_o}{2}} \tan\left(\frac{\theta_{fovo}}{2}\right)}{\sqrt{1 + \left(\frac{k - \frac{w_o}{2} - \frac{1}{2}}{\frac{w_o}{2}}\right)^2}}\right) \qquad (33)$$

The longitudinal intersecting length of this viewing ray with the camera array is $t \tan(\theta)$. A number $j_\theta$ is introduced, $$j_\theta = \frac{\tan(\theta) t}{d_c} \qquad (34)$$

The integer part of $j_\theta$ is denoted by $j_-$, $$j_- = int(j_\theta) \qquad (35)$$

If $j_\theta = j_-$ (i.e., $j_\theta$ is an integer) the $j_-$th camera is the most relevant camera, otherwise, a number $j_+$ is introduced, $$j_+ = j_- + 1 \qquad (36)$$

So, the $j_-$th and $j_+$th cameras are relevant to the viewing ray and their interpolation weights are $[1-(j_\theta-j_-)]$ and $(j_\theta-j_-)$ respectively. Furthermore, a determination should be made as to which pixels in each relevant camera correspond to the viewing ray.

Figure 20:
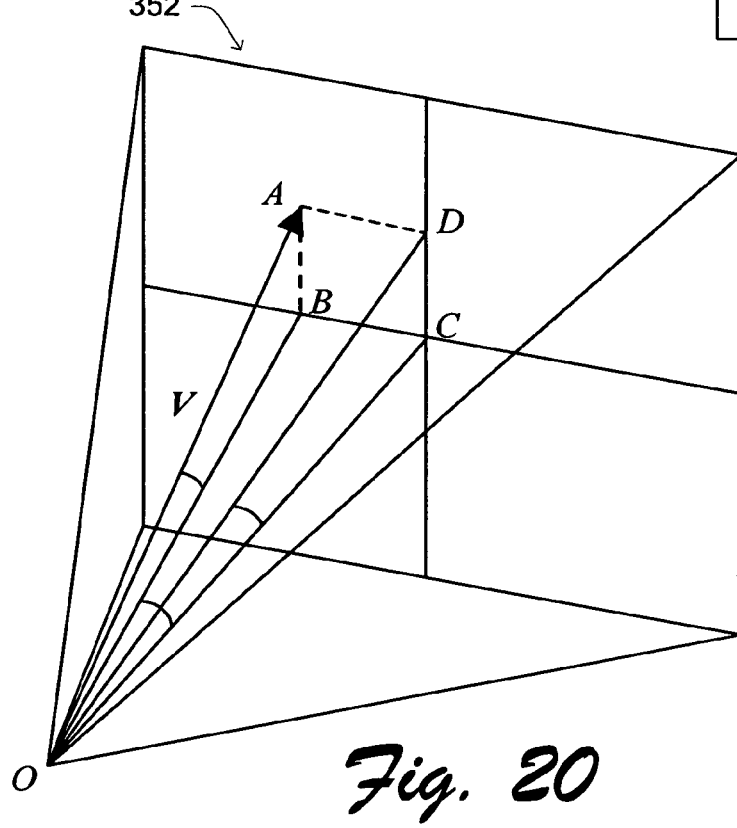
FIG. 20 illustrates an exemplary view of the view port of the capture camera in accordance with certain embodiments of the invention.

By way of example, consider the $j_-$th camera. FIG. 20 illustrates an exemplary view of the view port 352 of the capture camera. Assume that the above viewing ray V of the observer intersects with the image plane of the view port of the capture camera at point A. Let B be the projection of A on the lateral axis of the view port, therefore $\angle AOB$ is equal to the elevation angle of vector V. Suppose that a parallel line of the lateral axis passing through A intersects with the longitudinal axis at D. It is angle $\angle COD$ instead of angle $\angle AOB$ that directly determines the corresponding rows of the captured images. The relationship between $\angle COD$ and $\angle AOB$ is $$\tan(\angle COD) = \tan(\angle AOB)\sec(\angle BOC) \qquad (37)$$

where $\angle BOC$ is exactly the angle $\varphi$ in FIG. 18 and $\angle AOB$ is the angle $\theta$ in equation (33). From this, the corresponding row number in the image of camera $j_-$ is $$i = \frac{h_c \tan(\theta)\sec(\varphi)}{2\tan\left(\frac{\theta_{fovc}}{2}\right)} + \frac{h_c}{2} + \frac{1}{2} \qquad (38)$$

The integer part of i is denoted by $i_-$, $$i_- = int(i) \qquad (39)$$

If $i_- = 0$, the corresponding pixel number in the column of the high image is $(j_-+n) \times h_c + 1$ If $i_- \geq h_c$, the pixel number in the column of the high image is $(j_-+n+1)h_c$.

In the case that $i_-$ is greater than zero and smaller than $h_c$, if $i = i_-$ (i.e., i is an integer), the corresponding pixel number is $(j_-+n)h_c+i_-$, otherwise a number $i_+$ is introduced, $$i_+ = i_- + 1 \qquad (40)$$

So, the corresponding pixel numbers in the column of the high image are $(j_-+n) \times h_c + i_-$ and $(j_-+n) \times h_c + i_+$ respectively. Their weights are $[1-(i-i_-)]$ and $(i-i_-)$ respectively. The colors of the pixel in the observer's view image that the viewing ray passes through are interpolated by the colors of these corresponding pixels.

It should be noted that, due to the particular viewing ray, many pixels might be used in determining the color of the pixel in the observer's view image. For example, in determining the pixel color for a particular viewing ray there may be two high images that are considered, two columns of each of the two high images that are considered (totaling four columns), two cameras from each of the four columns that are considered (totaling eight cameras), and two pixels from each of the eight cameras (totaling sixteen pixels). Interpolation is used, as described above, to determine how all these pixels are to be combined to determine the color of the pixel in the observer's view image.

3D Observer Freedom of Movement

In the discussion of the previous sub-section the observer is allowed to move within a 2D circular region and observe longitudinal and lateral parallaxes and lighting changes without any geometric or photometric scene model recovery. However, in the above case, the motion of the observer is limited within the capture plane in which the beam rotates and the viewing direction can only be rotated laterally. The observer cannot take actions to duck, to stand, or to jump as in many natural situations when he or she wants to look at something from different points of view. Developing new motion constraint and rendering algorithms, an observer is able to move freely within the range of a 3D cylinder, and is further able to turn his or her head freely in a longitudinal or lateral direction.

The scene capture process to support 3D freedom of movement is similar to that used to support 2D freedom of movement, except that the length of the camera array may be extended. Additionally, the image combination and compression processes to support 3D freedom of movement are also similar to those used to support 2D freedom of movement, except that the whole area of each images captured by cameras should be stored (rather than reducing it to only a portion as described above with reference to FIG. 12).

Figure 21:
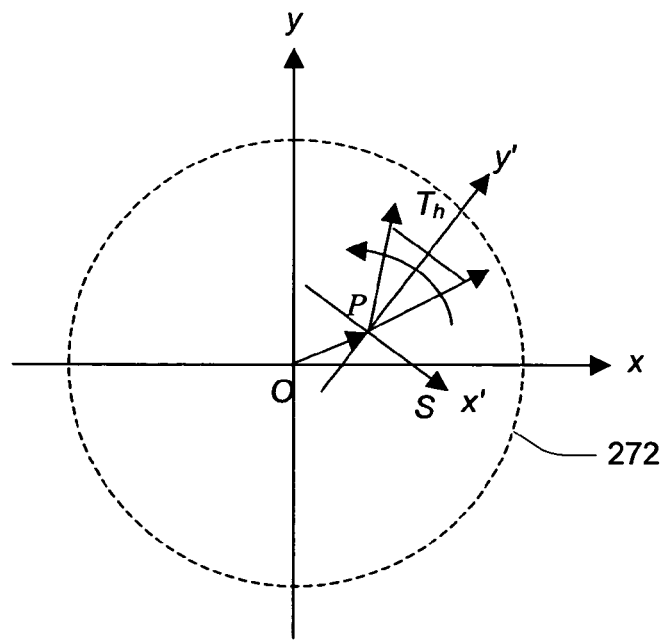
FIG. 21 illustrates an exemplary top view of a local coordinate system of the observer in accordance with certain embodiments of the invention.
Figure 22:
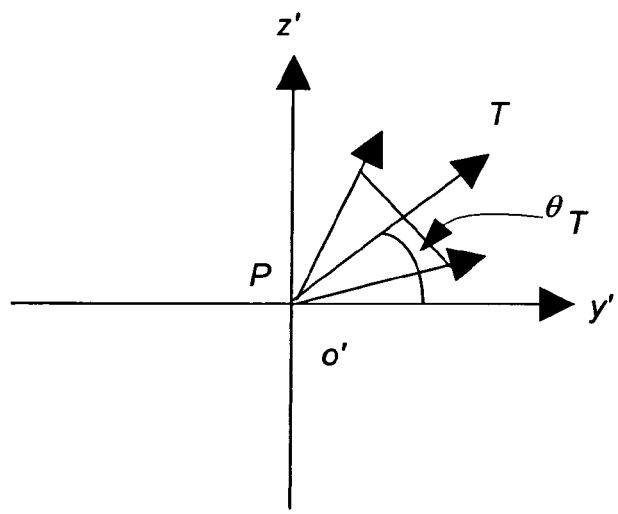
FIG. 22 illustrates an exemplary side view of a local coordinate system of the observer in accordance with certain embodiments of the invention.

In order to support 3D freedom of movement, the motion control of the observer becomes more complex. In addition to moving left, right, forward and backward, the observer may move upward and downward. The viewing direction of the observer may also be rotated longitudinally as well as laterally. As illustrated in FIGS. 21 and 22, a virtual local coordinate system of the observer is introduced. The origin o' of the local coordinate system is chosen to be the current viewing position P. The y' axis coincides with the projection of viewing direction T on the global xy plane. The z' axis is along the global z axis. Here P, T and $T_h$ are three 3D vectors. $T_h$ is along the projection of the viewing direction T on the xy plane. T and $T_h$ are unit vectors. The relationships of the motion commands in the virtual local coordinate system and the global coordinate system are described as follows:

The normalized projection vector $T_h$ of the viewing ray T is deduced as:

$$T_{hx} = \frac{T_x}{\sqrt{T_x^2 + T_y^2}} \quad (41)$$

$$T_{hy} = \frac{T_y}{\sqrt{T_x^2 + T_y^2}} \quad (42)$$

$$T_{hz} = 0 \quad (43)$$

where $T_{hx}$, $T_{hy}$ and $T_{hz}$ are the x, y and z coordinates of $T_h$, $T_x$ and $T_y$ are the x and y coordinates of T. $T_h$ is along the local axis y'. The direction of the local axis x' measured in the global coordinate system is denoted by S, $$S_x = T_{hy} \quad (44)$$

$$S_y = -T_{hx} \quad (45)$$

$$S_z = 0 \quad (46)$$

where $S_x$, $S_y$ and $S_z$ are the x, y and z coordinates of the unit vector S. The direction of the local axis z' measured in the global coordinate system is denoted by U, so, $U_x=0$, $U_y=0$, and $U_z=1$.

Assume that a translation rate of the viewing position along the local x', y' and z' axes are $\Delta x'$, $\Delta y'$ and $\Delta z'$, respectively. For movement to the left, the new viewing position becomes, $$P_{new} = P - \Delta x'S \quad (47)$$

For movement to the right, the new viewing position becomes, $$P_{new} = P + \Delta x'S \quad (48)$$

For movement forwards, the new viewing position becomes, $$P_{new} = P + \Delta y'T_h \quad (49)$$

For movement backwards, the new viewing position becomes, $$P_{new} = P - \Delta y'T_h \quad (50)$$

For movement upwards, the new viewing position becomes, $$P_{new} = P + \Delta z'U \quad (51)$$

For movement downwards, the new viewing position becomes, $$P_{new} = P - \Delta z'U \quad (52)$$

For lateral rotation movement, assume that a lateral rotation rate of $T_h$ along z' axis is $\Delta\phi$. For rotation to the left, $T_h$ becomes, $$T_{hnewx} = T_{hx}\cos(\Delta\phi) - T_{hy}\sin(\Delta\phi) \quad (53)$$

$$T_{hnewy} = T_{hx}\sin(\Delta\phi) + T_{hy}\cos(\Delta\phi) \quad (54)$$

and the corresponding new viewing direction becomes, $$T_{newx} = T_x\cos(\Delta\phi) - T_y\sin(\Delta\phi) \quad (55)$$

$$T_{newy} = T_x\sin(\Delta\phi) + T_y\cos(\Delta\phi) \quad (56)$$

For rotation to the right, $T_h$ becomes, $$T_{hnewx} = T_{hx}\cos(\Delta\phi) + T_{hy}\sin(\Delta\phi) \quad (57)$$

$$T_{hnewy} = -T_{hx}\sin(\Delta\phi) + T_{hy}\cos(\Delta\phi) \quad (58)$$

and the corresponding new viewing direction becomes, $$T_{newx} = T_x\cos(\Delta\phi) + T_y\sin(\Delta\phi) \quad (59)$$

$$T_{newy} = -T_x\sin(\Delta\phi) + T_y\cos(\Delta\phi) \quad (60)$$

For longitudinal rotational movement, assume that the longitudinal rotation rate of the view port direction T along x' axis is $\Delta\theta$. For rotation upwards, the new viewing direction becomes, $$T_{newz} = T_z\cos(\Delta\theta) + \sqrt{1-T_z^2}\sin(\Delta\theta) \quad (61)$$

$$T_{newx} = T_{hx}\sqrt{1-T_{newz}^2} \quad (62)$$

$$T_{newy} = T_{hy}\sqrt{1-T_{newz}^2} \quad (63)$$

For rotation downwards, the new viewing direction becomes, $$T_{newz} = T_z\cos(\Delta\theta) - \sqrt{1-T_z^2}\sin(\Delta\theta) \quad (64)$$

$$T_{newx} = T_{hx}\sqrt{1-T_{newz}^2} \quad (65)$$

$$T_{newy} = T_{hy}\sqrt{1-T_{newz}^2} \quad (66)$$

For zooming, assume that a rate of a zoom out command or a zoom in command is $\Delta\theta_{fovo}$. For zooming out, the new longitudinal field of view of the observer becomes, $$\theta_{newfovo} = \theta_{fovo} + \alpha\theta_{fovo} \quad (67)$$

The new lateral field of view of the observer can be obtained according to equation (11) above. For zooming in, the new longitudinal field of view of the observer becomes, $$\theta_{newfovo} = \theta_{fovo} - \Delta\theta_{fovo} \quad (68)$$

and the new lateral field of view of the observer can also be obtained according to equation (11). As described in the scene capture process above, the scene is captured by rotating a camera array along a circle. Therefore, the top and bottom areas of the cylinder have not been captured. In one implementation, the observer's motion and viewing direction are constrained in order to let the observer only see the part of space that has been captured. The constraint of viewing position P of the observer is that:

$$P_{x'}^2 + P_{y'}^2 < r^2 \quad (69)$$

where r is the radius of the wandering circle 272 as illustrated in FIG. 10. The z coordinate of P should obey another constraint, as described in more detail below.

The constraint of the lateral field of view of the observer is:

$$\phi_{fovo} < \pi \quad (70)$$

and $$\phi_{fovo} > \text{a minimum tolerance angle, for instance 10 degrees.} \quad (71)$$

The constraint of the longitudinal field of view of the observer and the elevation angle of viewing direction is:

$$\theta_T + \frac{\theta_{fovo}}{2} < \frac{\theta_{fovc}}{2} \quad (72)$$

and $$\theta_T - \frac{\theta_{fovo}}{2} > -\frac{\theta_{fovc}}{2} \quad (73)$$

This means the elevation angle of any viewing ray should not exceed the longitudinal field of view of the capture camera, and $$\theta_{fovo} > \text{a minimum tolerance angle, for instance 10 degrees.} \quad (74)$$

Figure 23:
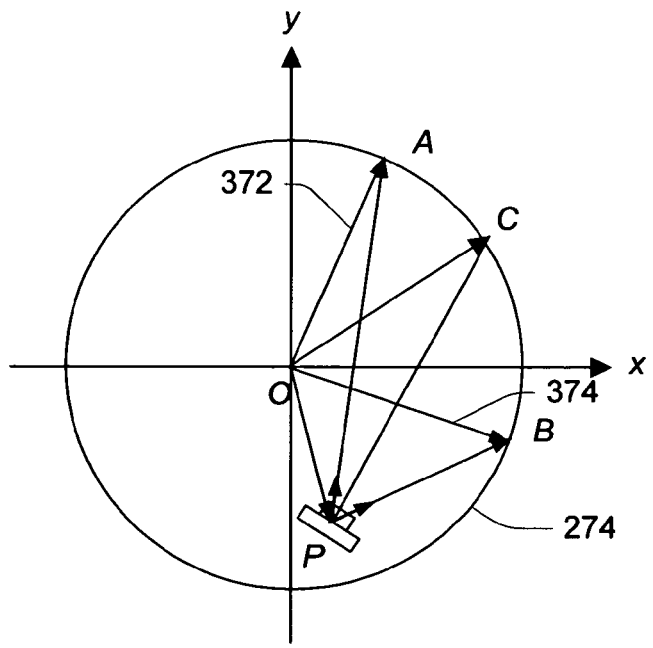
FIG. 23 is an example illustrating how to find the farthest point on the capture circle within the lateral field of view of the observer in accordance with certain embodiments of the invention.

An additional constraint in one implementation is described with reference to FIG. 23. As illustrated in FIG. 23, in order to find the farthest point on the capture circle 274 within the lateral field of view of the observer, the left and right edges of the lateral field of view of the observer are extended from viewing location P. Assume that the two edges intersect with the circle at point A and B, respectively. Two lines 372 and 374 are then drawn to connect point A and B with O, respectively. The distance between any point, suppose C, within the viewing image and P is calculated by:

$$\overline{CP}^2 = R^2 + \overline{OP}^2 - 2R \times \overline{OP} \cos(\angle COP) \quad (75)$$

and $$\angle BOP \leq \angle COP \leq \angle AOP \text{ or } \angle AOP \leq \angle COP \leq BOP \quad (76)$$

The farthest point on the circle within the view port should have a maximum value of (−cos ∠COP).

By way of example, consider the following cases. Suppose that ∠BOP<∠AOP, the opposite situation could be treated similarly. If $$\angle BOP \leq 180° \quad (77)$$

the farthest point should be point B. If $$\angle AOP \leq 180° \text{ and } \angle BOP \geq 180° \quad (78)$$

the farthest point should be point C with ∠COP=180°. If $$\angle AOP \geq 180° \quad (79)$$

the farthest point should be point A. $\overline{CP}$ is used to denote the found longest distance.

Next, consider the intersection of a viewing ray with the capture cylinder. The top and bottom edges of the observer's longitudinal field of view are extended. The z coordinates of the intersection points of the two edges with the cylinder are:

$$Z_{top} = P_z + \overline{CP} \tan\left(\theta_T + \frac{\theta_{fovo}}{2}\right) \quad (80)$$

$$Z_{bottom} = P_z + \overline{CP} \tan\left(\theta_T - \frac{\theta_{fovo}}{2}\right) \quad (81)$$

These values should satisfy the condition:

$$Z_{bottom} > 0 \text{ and } z_{top} < H \quad (82)$$

The rendering process to support 3D freedom of movement is similar to the rendering process to support 2D freedom of movement, and is performed according to the process described above with reference to FIG. 14. Additionally, the rendering for 3D movement takes into account the z coordinate of the observer's position and the elevation angle of the observer's viewing direction when determining which cameras on the longitudinal array and which pixels on the image columns are relevant to a viewing ray. Specifically, the elevation angle θ in Equations (34) and (38) are all replaced by θ+θ$_T$ if the observer has a longitudinal rotation angle θ$_T$ and the right side of Equation (34) should add P$_z$ if the observer is not located on the capture plane.

Stereo Rendering

The preceding section describes a process that allows an observer to see images of a captured scene when moving freely within a cylindrical area in 3D space or a circular area in 2D space. However, often times it is very natural for people to open both their eyes to observe scenes and experience stereo effects. By deducing the complex constraint of the motion of an eye pair (i.e., a two-body rigid object), and using a stereo rendering process as described below, natural stereo views of scenes can be rendered in real time. These stereo views can be rendered as individual images (e.g., two different images on the display), images on two different displays (e.g., the left and right display liquid crystal display screens of a pair of glasses, such as CrystalEyes available from StereoGraphics Corporation of San Rafael, Calif.), etc., or alternatively combined in a conventional manner into a single rendered image.

Rendering of a stereo view is not simply rendering two views of an observer. The distance between a human's two eyes is fixed and the viewing direction of the two eyes is almost identical except for very near objects. Therefore, the motion of a human's two eyes obeys certain rules. A two-body rigid object model is used below to describe the motion of an observer's two eyes.

The stereo rendering described below is discussed with reference to allowing 3D observer freedom of movement. Alternatively, the stereo rendering may also be applied when limiting an observer to 2D freedom of movement.

Figure 24:
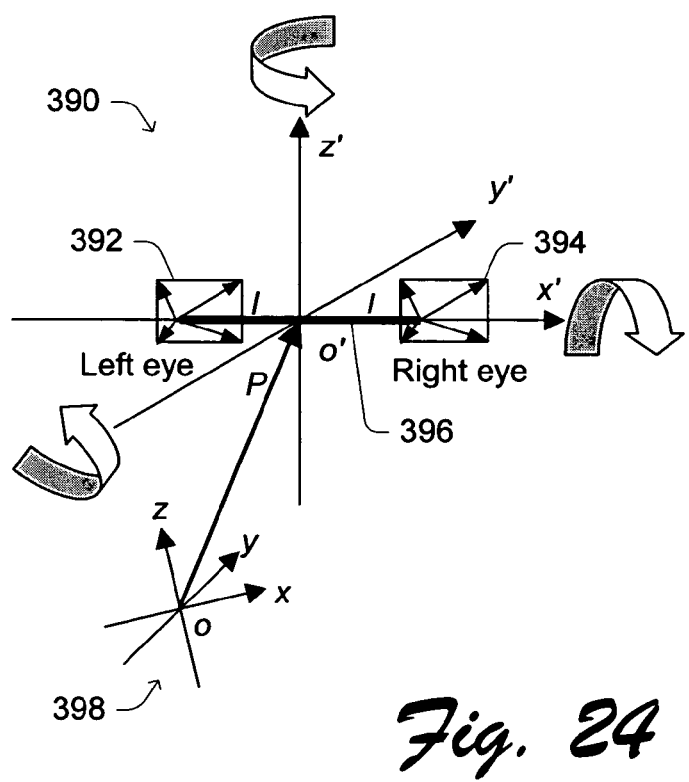
FIG. 24 illustrates exemplary translation and rotation freedoms of a pair of eyes as a two-body rigid object and the spatial relationship of the local coordinate system of the pair of eyes and the global coordinate system in accordance with certain embodiments of the invention.

FIG. 24 illustrates an exemplary global coordinate system 390 allowing for various freedoms of movement of an eye pair (left eye 392 and right eye 394). To perform the stereo rendering, the location of each eye of the eye pair 392, 394 is determined and used as the observer view point for rendering an image as discussed in the sections above. The allowed movements, and exemplary constraints on such movements, are discussed in more detail below.

As illustrated in FIG. 24, a local coordinate system 390 is introduced to describe the freedoms and motion of an eye pair 392, 394. Assume that the distance between the two eyes is 2 l. The origin o' of the local coordinate system 390 is located at the center of the line 396 connecting the two eyes 392, 394. The x' axis of the local coordinate system 390 is chosen to be along the line 396 connecting the two eyes 392, 394. The y' axis of the local coordinate system is chosen to be along the viewing direction of the eyes 392, 394.

As a two-body rigid object, the eye pair 392, 394 possesses six freedoms of motion. The origin o' can move in 3D space in the global coordinate system 398 (i.e., it has three translation freedoms—left/right, up/down, and forwards/backwards). P is used to denote the position of the origin o' of the local coordinate system 390 measured in the global coordinate system 398. The two-body rigid object can also rotate along y' and z' axes as well as its own connecting axis, x' axis (i.e., it has three rotation freedoms). The positions of each eye and the viewing direction of the eyes as the eye pair translates or rotates in 3D space are deduced.

Assume that the coordinates of the directions of x', y' and z' axes measured in the global coordinate system 398 are represented by three dimensional unit vectors S, T and U, respectively. These vectors S, T and U coincide with x, y and z axes of the global coordinate system 398 initially.

After movement commands are received, the translation and rotation formulas of the motion of origin o' and the zooming formulas are identical to those of the observer in the rendering process allowing 3D freedom of movement discussed above. After that, the global position of left eye 392 is $$E_l = P - l \times S \tag{83}$$

and of right eye 394 is $$E_r = P + l \times S \tag{84}$$

The viewing directions of each eye 392, 394 is along T.

Since not the whole outside scene is captured and there is intrinsic relationship between two eyes, in one implementation the motion of an observer is constrained so that he or she sees only the part of scene that has been captured.

The constraint of the motion is more complex than before. First, as a basic constraint we have $$(P_x - lS_x)^2 + (P_y - lS_y)^2 < r^2 \tag{85}$$

which means that the projection of the left eye is within the wandering circle 272; and $$(P_x + lS_x)^2 + (P_y + lS_y)^2 < r^2 \tag{86}$$

which means that the projection of the right eye is also within the wandering circle 272; and $$0 < P_z - lS_z < H \tag{87}$$

which means that the height of the left eye is within the height of the capture cylinder; and $$0 < P_z + lS_z < H \tag{88}$$

which means that the height of the right eye is also within the height of the capture cylinder. Since a cylinder is a convex object, the whole interval of line 396 that connects the two eyes is also within the cylinder if both eyes are within the cylinder. In addition, a comprehensive constraint should also be obeyed, as discussed in more detail below.

The eye pair is constrained so that the lowest elevation angle of any viewing ray in the viewing direction be larger than half of the negative longitudinal field of view of the camera $-\theta_{fovc}/2$, and the highest elevation angle of any viewing ray in the viewing direction be smaller than half of the longitudinal field of view of the camera $\theta_{fovc}/2$. Viewing rays with minimum or maximum elevation angles pass through four corners of the view port (the captured image). So, only four viewing rays passing through four corners of the view port need be considered for these constraints.

The normalized vector of the viewing ray passing through the top-left corner of the view port is:

$$D_{tl} = \text{normalize}\left(T - \tan\left(\frac{\varphi_{fovo}}{2}\right)S + \tan\left(\frac{\theta_{fovo}}{2}\right)U\right) \tag{89}$$

where $\phi_{fovo}$ is the lateral field of view of the view port and $\phi_{fovo}$ is the longitudinal field of view of the view port. The normalized vector of the viewing ray passing through the bottom-left corner of the view port is:

$$D_{bl} = \text{normalize}\left(T - \tan\left(\frac{\varphi_{fovo}}{2}\right)S - \tan\left(\frac{\theta_{fovo}}{2}\right)U\right) \tag{90}$$

The normalized vector of the viewing ray passing through the top-right corner of the view port is:

$$D_{tr} = \text{normalize}\left(T + \tan\left(\frac{\varphi_{fovo}}{2}\right)S + \tan\left(\frac{\theta_{fovo}}{2}\right)U\right) \tag{91}$$

The normalized vector of the viewing ray passing through the bottom-right corner of the view port is:

$$D_{br} = \text{normalize}\left(T + \tan\left(\frac{\varphi_{fovo}}{2}\right)S - \tan\left(\frac{\theta_{fovo}}{2}\right)U\right) \tag{92}$$

Four z coordinates of the four vector are also compared. The viewing ray with the largest z coordinate has the highest elevation angle of $\arcsin(z_D)$. The corresponding constraint is:

$$\arcsin(z_D) < \frac{\theta_{fovc}}{2} \tag{93}$$

The viewing ray with the smallest z coordinate has the lowest elevation angle of $\arcsin(z_d)$. The corresponding constraint is:

$$\arcsin(z_d) > -\frac{\theta_{fovc}}{2} \tag{94}$$

Additionally, a comprehensive constraint is that the intersection point of any viewing ray with the cylinder does not exceed the top and bottom limits of the cylinder wall (i.e., the z coordinate of any such intersection point must be in the range of 0 to H).

Because of the existence of the rotation along the y' axis, it is not always easy to determine which viewing ray in the view port has the lowest or highest intersection point. In one implementation, a check is made for every viewing ray from every edge of the view port to ensure that the constraint is not violated. Alternatively, such a check may not be employed due to the time required (e.g., which can result in a delay in playback). In one implementation, a more stringent (but computationally quicker) constraint is applied.

This constraint is applied by using a view cone with its half angle $\omega_{fov}/2$ equaling the angle between the viewing ray passing through any corner of the view port and the direction of the view port. Any viewing ray in the view port is within the view cone, and therefore any intersection point of any viewing ray with the cylinder is in the range of the intersection points of the cone with the cylinder. If the intersection points of the cone with the cylinder do not exceed the wall of the cylinder, then the intersection points of the viewing ray of the view port are also in the valid range of the cylinder wall.

The value of half of the angle of the view cone is obtained by calculating the dot product of a corner viewing ray and the direction of the view port, which is:

$$\frac{\omega_{fov}}{2} = \arccos\left(\frac{1}{\sqrt{1+\tan^2\left(\frac{\varphi_{fovo}}{2}\right)+\tan^2\left(\frac{\theta_{fovo}}{2}\right)}}\right) \quad (95)$$

The elevation angle of the direction T of the view port is:

$$\theta_T = \arcsin(T_z) \quad (96)$$

The highest and lowest elevation angles of the viewing rays from the cone are:

$$\theta_T + \frac{\omega_{fov}}{2}$$

and $$\theta_T - \frac{\omega_{fov}}{2}$$

respectively.

In order to calculate the smallest and largest z coordinates of the intersection points, the horizontal distance between the intersection point and the left and right eyes is calculated. As illustrated in FIG. 21, we use a two dimensional unit vector $T_h$ to represent the unit projection of the direction T of the view port on the capture plane. Two two-dimensional vector $E_{lh}$ and $E_{rh}$ are also introduced represent the projection of left and right eyes on the capture plane, respectively. Their relationships are:

$$T_{hx} = \frac{T_x}{\sqrt{T_x^2+T_y^2}} \quad (97)$$

$$T_{hy} = \frac{T_y}{\sqrt{T_x^2+T_y^2}} \quad (98)$$

and $$E_{lhx} = P_x - lS_x \quad (99)$$

$$E_{lhy} = P_y - lS_y \quad (100)$$

$$E_{rhx} = P_x + lS_x \quad (101)$$

$$E_{rhy} = P_y + lS_y \quad (102)$$

The positive roots $t_l$ and $t_r$ of the equations $$\|E_{lh}+t_l T_h\|=R \quad (103)$$

and $$\|E_{rh}+t_r T_h\|=R \quad (104)$$

are the horizontal distances between the intersection points and the left eye and the right eye, respectively. Therefore, the highest and lowest z coordinates of the intersection points are $$E_{lz}+t_l\tan\left(\theta_T+\frac{\omega_{fov}}{2}\right), \text{ if } S_y<0,$$

or $$E_{rz}+t_r\tan\left(\theta_T+\frac{\omega_{fov}}{2}\right), \text{ if } S_y>=0,$$

and $$E_{lz}+t_l\tan\left(\theta_T-\frac{\omega_{fov}}{2}\right), \text{ if } S_y>=0,$$

or $$E_{rz}+t_r\tan\left(\theta_T-\frac{\omega_{fov}}{2}\right), \text{ if } S_y<0$$

respectively.

The above highest z coordinate should be less than H, and the above lowest z coordinate should be greater than 0.

CONCLUSION

Thus, scene capturing and view rendering based on a longitudinally aligned camera array has been described. The use of a longitudinally aligned camera array advantageously reduces vertical distortions and allows more realistic rendering of views when an observer is moving about within the captured scene. Additionally, stereo rendering of images can be supported, advantageously providing a more realistic view of the scene based on a pair of observer's eyes.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. An apparatus to capture images of a surrounding scene, the apparatus comprising:
   a camera array bar to support a camera at a plurality of substantially parallel capture planes;
   a camera, coupled to the camera array bar, to capture a plurality of images of a surrounding scene in each of the plurality of substantially parallel capture planes as the camera moves through each of the plurality of substantially parallel capture planes, wherein the camera is positioned to look outward toward the surrounding scene in a radial direction;
   a beam coupled to the camera array bar at an end and coupled to a counterweight on an other end, wherein the camera array bar and the counterweight are located on opposite ends of the beam; and
   the beam rotatably coupled to a support at a center of rotation, allowing the beam to rotate about 360 degrees around the center of rotation, wherein the beam is rotated in a plane substantially perpendicular to the camera array bar.

2. An apparatus as recited in claim 1, camera comprises one or more of: a video camera, a still camera, a digital camera, a film camera, a plurality of Charge Coupled Device (CCD) elements.

3. An apparatus as recited in claim 1, further comprising another camera, coupled to the camera array bar, to capture images in one of the plurality of substantially parallel capture planes while the camera captures images in another of the plurality of substantially parallel capture planes.

4. An apparatus as recited in claim 1, wherein the camera is moveably coupled to the camera array bar such that the camera can be moved to positions of the camera array bar that coincide with the plurality of substantially parallel capture planes.

5. An apparatus as recited in claim 1, wherein the camera array bar is substantially perpendicular to the plurality of substantially parallel capture planes.

6. An apparatus as recited in claim 5, further comprising a second camera array bar, substantially perpendicular to the plurality of substantially parallel capture planes, to support another camera at the plurality of substantially parallel capture planes.

7. An apparatus as recited in claim 1, wherein the camera is configured to capture slit images.

8. An apparatus as recited in claim 1, wherein the camera is configured to capture whole area images.

9. An apparatus as recited in claim 1, wherein the camera is coupled to the camera array bar to move through each of the plurality of substantially parallel capture planes in a pattern of rotation and to capture images in a direction tangential to the pattern of rotation.

10. An apparatus as recited in claim 1, wherein the camera is coupled to the camera array bar to move through each of the plurality of substantially parallel capture planes in a pattern of rotation and to capture images in a direction along a radial of the pattern of rotation.

11. An apparatus to capture images of a surrounding scene, the apparatus comprising:
a camera array bar to support a plurality of cameras at a plurality of substantially parallel capture planes;
a plurality of cameras, coupled to the camera array bar, each camera to capture a plurality of images of the surrounding scene in one of the plurality of substantially parallel capture planes as the camera rotates through the one of the plurality of substantially parallel capture planes;
a beam coupled to the camera array bar at an end and coupled to a counterweight on an other end, wherein the camera array bar and the counterweight are located on opposite ends of the beam; and
the beam rotatably coupled to a support at a center of rotation, allowing the beam to rotate about 360 degrees around the center of rotation, wherein the beam is rotated in a plane substantially perpendicular to the camera array bar.

12. An apparatus as recited in claim 11, camera comprises one or more of: a video camera, a still camera, a digital camera, a film camera, a plurality of Charge Coupled Device (CCD) elements.

13. An apparatus as recited in claim 11, wherein the camera array bar is substantially perpendicular to the plurality of substantially parallel capture planes.

14. An apparatus as recited in claim 13, further comprising a second camera array bar, substantially perpendicular to the plurality of substantially parallel capture planes, to support another plurality of cameras at the plurality of substantially parallel capture planes.

15. An apparatus as recited in claim 11, wherein each of the plurality of cameras is configured to capture slit images.

16. An apparatus as recited in claim 11, wherein each of the plurality of cameras is configured to capture whole area images.

17. An apparatus as recited in claim 11, wherein each of the plurality of cameras is coupled to the camera array bar to move through one of the plurality of substantially parallel capture planes in a pattern of rotation and to capture images in a direction tangential to the pattern of rotation.

18. An apparatus as recited in claim 11, wherein each of the plurality of cameras is coupled to the camera array bar to move through one of the plurality of substantially parallel capture planes in a pattern of rotation and to capture images in a direction along a radial of the pattern of rotation.

19. A method of capturing a surrounding scene, the method having computer instructions executable by a processor, comprising:
rotating one or more cameras through a plurality of capture planes that are substantially parallel to one another, wherein the one or more cameras are coupled to a camera array bar and are positioned to look outward toward the surrounding scene, wherein the camera array bar is coupled to a beam at an end of the beam and the beam is coupled to a counterweight on an other end;
capturing, by each of the one or more cameras, a plurality of images of the surrounding scene as the one or more cameras rotate through the plurality of capture planes; and
exporting the plurality of images of the surrounding scene captured by the one or more cameras to a computer system to combine captures into a rendered view of the surrounding scene.

20. A method as recited in claim 19, wherein the rotating comprises rotating the one or more cameras through the plurality of capture planes in a substantially circular pattern of rotation.

21. A method as recited in claim 19, wherein the capturing comprises capturing slit images from each of the one or more cameras.

22. A method as recited in claim 19, wherein the capturing comprises capturing whole images from each of the one or more cameras.

23. A method as recited in claim 19, wherein the rotating comprises concurrently rotating each of a plurality of cameras through a different one of the plurality of capture planes.

24. A method as recited in claim 19, wherein the rotating comprises rotating the one or more cameras through the plurality of capture planes in a pattern of rotation, and wherein the capturing comprises capturing images in a direction tangential to the pattern of rotation.

25. A method as recited in claim 19, wherein the rotating comprises rotating the one or more cameras through the plurality of capture planes in a pattern of rotation, and wherein the capturing comprises capturing images in a direction along a radial of the pattern of rotation.

26. A method as recited in claim 19, further comprising combining the plurality of captured images to generate a scene data file corresponding to the scene.

27. A method as recited in claim 19, further comprising saving the plurality of captured images.

28. A method as recited in claim 27, wherein the one or more cameras each have a longitudinal field of view, and wherein the saving comprises, for each of the one or more cameras, saving only a portion of each image captured by the camera based on the longitudinal field of the camera and an anticipated subsequent viewing plane, wherein the anticipated subsequent viewing plane is a plane substantially parallel to the plurality of capture planes in which an observer is determined to be located in for subsequent rendering of views of the scene.

29. A method as recited in claim 28, wherein the anticipated subsequent viewing plane is one of the plurality of capture planes that is in substantially the middle of the plurality of capture planes.

30. A method as recited in claim 28, wherein the saved portion of each image for a camera is determined by determining a first line from a central point of rotation on the anticipated subsequent viewing plane and a center of a longitudinally adjacent camera, determining a second line that is parallel to the first line and extends from a center of the camera, determining a third line from the central point of rotation to a longitudinal field of view limit, and identifying as the saved portion the portion of the captured image that is located between the second line and the third line.

31. One or more computer-readable memories containing a computer program that is executable by a processor to perform the method recited in claim 19.

32. One or more computer-readable media having stored thereon a computer program that, when executed by one or more processors of a computer, causes the one or more processors to perform acts including:
   receiving a plurality of images of a surrounding scene that were captured from a plurality of different locations in a plurality of capture planes and imported from one or more cameras, coupled to a camera array bar, to capture the plurality of images of the surrounding scene;
   combining the plurality of images into a scene data file to generate a rendered view image of the surrounding scene, wherein generating the rendered view image comprises:
      determining a viewing position and a direction of each viewing ray passing through each pixel of an image to be rendered;
      determining an intersection point of a projection of a viewing ray and a capture circle to determine whether one or more of arrays of mosaics are relevant to the viewing ray; and
      calculating an angle between the viewing ray and a camera direction at the intersection point to determine which pixel is to be used in display; and
   presenting an image representing a view seen by an observer within the surrounding scene maintained in the scene data file, wherein the view is rendered by using a plurality of parameters to describe a location of the observer and a direction of the view.

33. One or more computer-readable media as recited in claim 32 of rotation in different ones of the plurality of capture planes, and wherein the combining comprises generating a high image comprising a concatenation of images captured at the subset of the plurality of different locations.

34. One or more computer-readable media as recited in claim 32, wherein the surrounding scene comprises a synthetic scene.

35. One or more computer-readable media as recited in claim 32, wherein the receiving comprises receiving a plurality of images of surrounding scene that were captured by one or more cameras.

36. One or more computer-readable media as recited in claim 35, wherein the one or more cameras each have a longitudinal field of view, and wherein the combining comprises, for each of the one or more cameras, saving into the scene data file only a portion of each image captured by the camera based on the longitudinal field of the camera and an anticipated subsequent viewing plane, wherein the anticipated subsequent viewing plane is a plane substantially parallel to the plurality of capture planes in which an observer is determined to be located in for subsequent rendering of views of the scene.

37. One or more computer-readable media as recited in claim 36, wherein the anticipated subsequent viewing plane is one of the plurality of capture planes that is in substantially the middle of the plurality of capture planes.

38. One or more computer-readable media as recited in claim 36, wherein the saved portion of each image for a camera is determined by determining a first line from a central point of rotation on the anticipated subsequent viewing plane and a center of a longitudinally adjacent camera, determining a second line that is parallel to the first line and extends from a center of the camera, determining a third line from the central point of rotation to a longitudinal field of view limit, and identifying as the saved portion the portion of the captured image that is located between the second line and the third line.

* * * * *